(12) United States Patent
Otaka et al.

(10) Patent No.: US 10,346,073 B2
(45) Date of Patent: Jul. 9, 2019

(54) STORAGE CONTROL APPARATUS FOR SELECTING MEMBER DISKS TO CONSTRUCT NEW RAID GROUP

(71) Applicant: FUJITSU LIMITED, Kawasaki-shi, Kanagawa (JP)

(72) Inventors: Atsuhiro Otaka, Kawasaki (JP); Akiko Sakaguchi, Yokohama (JP); Hidetoshi Satou, Kawasaki (JP); Takahiro Yumoto, Nagano (JP); Akira Yamazaki, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/138,884

(22) Filed: Apr. 26, 2016

(65) Prior Publication Data

US 2016/0342358 A1     Nov. 24, 2016

(30) Foreign Application Priority Data

May 20, 2015     (JP) ................................ 2015-102369

(51) Int. Cl.
   *G06F 3/06*     (2006.01)
(52) U.S. Cl.
   CPC .......... *G06F 3/0631* (2013.01); *G06F 3/0604* (2013.01); *G06F 3/0689* (2013.01)
(58) Field of Classification Search
   CPC ..... G06F 3/0631; G06F 3/0604; G06F 3/0689
   See application file for complete search history.

(56) References Cited

U.S. PATENT DOCUMENTS

| 6,098,119 A | 8/2000 | Surugucchi et al. |
| 8,782,342 B2 | 7/2014 | Edwards, III et al. |
| 2006/0095706 A1* | 5/2006 | Aoyama ............... G06F 3/0604 711/171 |

(Continued)

FOREIGN PATENT DOCUMENTS

| JP | 9-006547 | 1/1997 |
| JP | 2000-20245 | 1/2000 |
| WO | 2014/184943 A1 | 11/2014 |

OTHER PUBLICATIONS

Japanese Office Action dated Nov. 6, 2018 for corresponding Japanese Patent Application No. 2015-102369, with English Translation, 5 pages.

*Primary Examiner* — Ann J Lo
*Assistant Examiner* — Jane Wei
(74) *Attorney, Agent, or Firm* — Fujitsu Patent Center

(57) ABSTRACT

A storage control apparatus includes a memory and a processor. The memory stores selection condition information relating to a selection condition for storage devices to construct a RAID, group information relating to groups to which the storage devices belong, and connection information indicating a connection configuration of the storage devices. The processor is configured to perform a procedure including: selecting the storage devices that match the selection condition information; extracting groups to which the selected storage devices belong based on the group information; assigning group priorities, which indicate selection priorities in units of the groups of the storage devices, to the extracted groups based on the connection information; and selecting one storage device from each of the extracted groups in accordance with the group priorities until a predetermined number of storage devices have been selected.

7 Claims, 23 Drawing Sheets

(56) References Cited

U.S. PATENT DOCUMENTS

| | | | |
|---|---|---|---|
| 2011/0185213 A1* | 7/2011 | Yoshida | G06F 1/26 713/340 |
| 2012/0054457 A1* | 3/2012 | Sasage | G06F 3/0613 711/162 |
| 2013/0179657 A1* | 7/2013 | Isomura | G06F 3/0605 711/165 |
| 2014/0244927 A1 | 8/2014 | Goldberg et al. | |
| 2015/0378637 A1* | 12/2015 | Takamura | G06F 3/0605 711/114 |

* cited by examiner

300 CANDIDATE DRIVE ENCLOSURE LIST

| CE | CONNECTION ORDER / PORT | 0 | 1 | 2 | 3 |
|---|---|---|---|---|---|
| CE#00 | #00 | DE#00 | DE#01 | DE#02 | DE#03 |
| | #01 | DE#04 | DE#05 | DE#06 | DE#07 |
| | #02 | DE#08 | DE#09 | DE#0A | DE#0B |
| | #03 | DE#0C | DE#0D | DE#0E | DE#0F |
| CE#01 | #04 | DE#10 | DE#11 | DE#12 | DE#13 |
| | #05 | DE#14 | DE#15 | DE#16 | DE#17 |
| | #06 | DE#18 | DE#19 | DE#1A | DE#1B |
| | #07 | DE#1C | DE#1D | DE#1E | DE#1F |

FIG. 12

301 FIRST LIST

| CE | CONNECTION ORDER / PORT | 0 | | 1 | | 2 | | 3 | |
|---|---|---|---|---|---|---|---|---|---|
| CE#00 | #00 | DE#00 | [0] | DE#01 | | DE#02 | [1] | DE#03 | |
| | #01 | DE#04 | | DE#05 | | DE#06 | | DE#07 | |
| | #02 | DE#08 | | DE#09 | | DE#0A | [0] | DE#0B | |
| | #03 | DE#0C | [0] | DE#0D | | DE#0E | [1] | DE#0F | |
| CE#01 | #04 | DE#10 | [0] | DE#11 | | DE#12 | [1] | DE#13 | [2] |
| | #05 | DE#14 | [0] | DE#15 | | DE#16 | [1] | DE#17 | [2] |
| | #06 | DE#18 | | DE#19 | | DE#1A | [0] | DE#1B | [1] |
| | #07 | DE#1C | | DE#1D | | DE#1E | [0] | DE#1F | [1] |

FIG. 13

302 SECOND LIST

| CE | CONNECTION ORDER / PORT | | 0 | | 1 | | 2 | | 3 | |
|---|---|---|---|---|---|---|---|---|---|---|
| CE#00 | #00 | (0) | DE#00 | [0] | DE#01 | | DE#02 | [1] | DE#03 | |
| | #01 | | DE#04 | | DE#05 | | DE#06 | | DE#07 | |
| | #02 | (1) | DE#08 | | DE#09 | | DE#0A | [0] | DE#0B | |
| | #03 | (2) | DE#0C | [0] | DE#0D | | DE#0E | [1] | DE#0F | |
| CE#01 | #04 | (0) | DE#10 | [0] | DE#11 | | DE#12 | [1] | DE#13 | [2] |
| | #05 | (1) | DE#14 | [0] | DE#15 | | DE#16 | [1] | DE#17 | [2] |
| | #06 | (2) | DE#18 | | DE#19 | | DE#1A | [0] | DE#1B | [1] |
| | #07 | (3) | DE#1C | | DE#1D | | DE#1E | [0] | DE#1F | [1] |

FIG. 14

303 THIRD LIST

| CE | CONNECTION ORDER / PORT | 0 | | 1 | | 2 | | 3 | |
|---|---|---|---|---|---|---|---|---|---|
| CE#00 <0> | #00 (0) | DE#00 | [0] | DE#01 | | DE#02 | [1] | DE#03 | |
| | #01 | DE#04 | | DE#05 | | DE#06 | | DE#07 | |
| | #02 (1) | DE#08 | | DE#09 | | DE#0A | [0] | DE#0B | |
| | #03 (2) | DE#0C | [0] | DE#0D | | DE#0E | [1] | DE#0F | |
| CE#01 <1> | #04 (0) | DE#10 | [0] | DE#11 | | DE#12 | [1] | DE#13 | [2] |
| | #05 (1) | DE#14 | [0] | DE#15 | | DE#16 | [1] | DE#17 | [2] |
| | #06 (2) | DE#18 | | DE#19 | | DE#1A | [0] | DE#1B | [1] |
| | #07 (3) | DE#1C | | DE#1D | | DE#1E | [0] | DE#1F | [1] |

FIG. 15

304 FOURTH LIST
(ASSIGNMENT OF DRIVE ENCLOSURE PRIORITIES)

| FIRST KEY | SECOND KEY | THIRD KEY | CANDIDATE DRIVE ENCLOSURE | DRIVE ENCLOSURE PRIORITY |
|---|---|---|---|---|
| [0] | (0) | <0> | DE#00 | 1 |
| | | <1> | DE#10 | 2 |
| | (1) | <0> | DE#0A | 3 |
| | | <1> | DE#14 | 4 |
| | (2) | <0> | DE#0C | 5 |
| | | <1> | DE#1A | 6 |
| | (3) | <0> | — | — |
| | | <1> | DE#1E | 7 |
| [1] | (0) | <0> | DE#02 | 8 |
| | | <1> | DE#12 | 9 |
| | (1) | <0> | — | — |
| | | <1> | DE#16 | 10 |
| | (2) | <0> | DE#0E | 11 |
| | | <1> | DE#1B | 12 |
| | (3) | <0> | — | — |
| | | <1> | DE#1F | 13 |
| [2] | (0) | <0> | — | — |
| | | <1> | DE#13 | 14 |
| | (1) | <0> | — | — |
| | | <1> | DE#17 | 15 |
| | (2) | <0> | — | — |
| | | <1> | — | — |
| | (3) | <0> | — | — |
| | | <1> | — | — |

FIG. 16

400 HOT SPARE CANDIDATE DRIVE ENCLOSURE LIST

| CE | CONNECTION ORDER / PORT | 0 | | 1 | 2 | | 3 |
|---|---|---|---|---|---|---|---|
| CE#00 | #00 | DE#00 | Mn | DE#01 | DE#02 | A | DE#03 |
| | #01 | DE#04 | | DE#05 | DE#06 | | DE#07 |
| | #02 | DE#08 | | DE#09 | DE#0A | A | DE#0B |
| | #03 | DE#0C | Mn | DE#0D | DE#0E | Mn | DE#0F |
| CE#01 | #04 | DE#10 | Mn | DE#11 | DE#12 | A | DE#13 |
| | #05 | DE#14 | Mb | DE#15 | DE#16 | A | DE#17 |
| | #06 | DE#18 | | DE#19 | DE#1A | | DE#1B |
| | #07 | DE#1C | | DE#1D | DE#1E | | DE#1F |

FIG. 18

401 WEIGHTED HOT SPARE CANDIDATE DRIVE ENCLOSURE LIST

| CE | CONNECTION ORDER / PORT | | 0 | | 1 | 2 | | 3 |
|---|---|---|---|---|---|---|---|---|
| CE#00 (C=3) | #00 | P=1 | DE#00 | Mn=1 | DE#01 | DE#02 | A=0 | DE#03 |
| | #01 | | DE#04 | | DE#05 | DE#06 | | DE#07 |
| | #02 | P=0 | DE#08 | | DE#09 | DE#0A | A=0 | DE#0B |
| | #03 | P=2 | DE#0C | Mn=1 | DE#0D | DE#0E | Mn=1 | DE#0F |
| CE#01 (C=1) | #04 | P=1 | DE#10 | Mn=1 | DE#11 | DE#12 | A=0 | DE#13 |
| | #05 | P=0 | DE#14 | Mb | DE#15 | DE#16 | A=0 | DE#17 |
| | #06 | | DE#18 | | DE#19 | DE#1A | | DE#1B |
| | #07 | | DE#1C | | DE#1D | DE#1E | | DE#1F |

FIG. 19

402 FIRST HOT SPARE LIST

| CE | CONNECTION ORDER / PORT | | | 0 | | | 1 | 2 | | | 3 |
|---|---|---|---|---|---|---|---|---|---|---|---|
| CE#00 (C=3) | #00 | P=1 | | DE#00 | Mn=1 | [1] | DE#01 | DE#02 | A=0 | [O] | DE#03 |
| | #01 | | | DE#04 | | | DE#05 | DE#06 | | | DE#07 |
| | #02 | P=0 | | DE#08 | | | DE#09 | DE#0A | A=0 | [O] | DE#0B |
| | #03 | P=2 | | DE#0C | Mn=1 | [O] | DE#0D | DE#0E | Mn=1 | [1] | DE#0F |
| CE#01 (C=1) | #04 | P=1 | | DE#10 | Mn=1 | [1] | DE#11 | DE#12 | A=0 | [O] | DE#13 |
| | #05 | P=0 | | DE#14 | Mb | | DE#15 | DE#16 | A=0 | [O] | DE#17 |
| | #06 | | | DE#18 | | | DE#19 | DE#1A | | | DE#1B |
| | #07 | | | DE#1C | | | DE#1D | DE#1E | | | DE#1F |

FIG. 20

403 SECOND HOT SPARE LIST

| CE | CONNECTION ORDER / PORT | | | 0 | | | 1 | 2 | | | 3 |
|---|---|---|---|---|---|---|---|---|---|---|---|
| CE#00 (C=3) | #00 | P=1 | (1) | DE#00 | Mn=1 | [1] | DE#01 | DE#02 | A=0 | [O] | DE#03 |
| | #01 | | | DE#04 | | | DE#05 | DE#06 | | | DE#07 |
| | #02 | P=0 | (O) | DE#08 | | | DE#09 | DE#0A | A=0 | [O] | DE#0B |
| | #03 | P=2 | (2) | DE#0C | Mn=1 | [O] | DE#0D | DE#0E | Mn=1 | [1] | DE#0F |
| CE#01 (C=1) | #04 | P=1 | (1) | DE#10 | Mn=1 | [1] | DE#11 | DE#12 | A=0 | [O] | DE#13 |
| | #05 | P=0 | (O) | DE#14 | Mb | | DE#15 | DE#16 | A=0 | [O] | DE#17 |
| | #06 | | | DE#18 | | | DE#19 | DE#1A | | | DE#1B |
| | #07 | | | DE#1C | | | DE#1D | DE#1E | | | DE#1F |

FIG. 21

404 THIRD HOT SPARE LIST

| CE | PORT / CONNECTION ORDER | | | 0 | | | 1 | 2 | | | 3 |
|---|---|---|---|---|---|---|---|---|---|---|---|
| CE#00 (C=3)<1> | #00 | P=1 | (1) | DE#00 | Mn=1 | [1] | DE#01 | DE#02 | A=0 | [O] | DE#03 |
| | #01 | | | DE#04 | | | DE#05 | DE#06 | | | DE#07 |
| | #02 | P=0 | (O) | DE#08 | | | DE#09 | DE#0A | A=0 | [O] | DE#0B |
| | #03 | P=2 | (2) | DE#0C | Mn=1 | [O] | DE#0D | DE#0E | Mn=1 | [1] | DE#0F |
| CE#01 (C=1)<O> | #04 | P=1 | (1) | DE#10 | Mn=1 | [1] | DE#11 | DE#12 | A=0 | [O] | DE#13 |
| | #05 | P=0 | (O) | DE#14 | Mb | | DE#15 | DE#16 | A=0 | [O] | DE#17 |
| | #06 | | | DE#18 | | | DE#19 | DE#1A | | | DE#1B |
| | #07 | | | DE#1C | | | DE#1D | DE#1E | | | DE#1F |

FIG. 22

405  FOURTH HOT SPARE LIST

| FIRST KEY | SECOND KEY | THIRD KEY | HOT SPARE CANDIDATE DRIVE ENCLOSURE | HOT SPARE PRIORITY |
|---|---|---|---|---|
| [0] | (0) | <0> | DE#16 | 1 |
| | | <1> | DE#0A | 2 |
| | (1) | <0> | DE#12 | 3 |
| | | <1> | DE#02 | 4 |
| | (2) | <0> | — | — |
| | | <1> | DE#0C | 5 |
| [1] | (0) | <0> | — | — |
| | | <1> | — | — |
| | (1) | <0> | DE#10 | 6 |
| | | <1> | DE#00 | 7 |
| | (2) | <0> | — | — |
| | | <1> | DE#0E | 8 |

FIG. 23

STORAGE CONTROL APPARATUS FOR SELECTING MEMBER DISKS TO CONSTRUCT NEW RAID GROUP

CROSS-REFERENCE TO RELATED APPLICATION

This application is based upon and claims the benefit of priority of the prior Japanese Patent Application No. 2015-102369, filed on May 20, 2015, the entire contents of which are incorporated herein by reference.

FIELD

The present embodiments discussed herein are related to a storage control apparatus and a storage system.

BACKGROUND

In recent years, there has been a large increase in the capacity of storage apparatuses, which are now commonly equipped with multiple storage devices. In keeping with the diversity of user needs regarding cost and performance, storage apparatuses may include different types of storage devices, such as Hard Disk Drives (HDDs) and Solid State Drives (SSDs), and the storage capacity and access speed may differ even for the same storage devices.

There is also a tendency for storage apparatuses to use a greater variety of storage devices for expansion and maintenance reasons. To facilitate expansion, some storage apparatuses are provided with one or more drive enclosures that can house a plurality of storage devices.

To protect data from storage device failures, storage apparatuses use a technology called Redundant Arrays of Inexpensive Disks (RAID). To set up a RAID in a storage apparatus, storage devices are selected to construct the RAID. A setting operation is then performed manually or automatically.

See, for example, the following documents:
Japanese Laid-open Patent Publication No. 2000-20245
Japanese Laid-open Patent Publication No. 09-6547
U.S. Pat. No. 8,782,342

However, when a larger number and greater variety of storage devices are connected to a storage apparatus, there is an increase in complexity and it becomes difficult to select the storage devices to construct a RAID. When selecting the storage devices to construct a RAID, it is favorable to consider the possibility of failures occurring not only for individual storage devices but also for drive enclosures that house a plurality of storage devices.

SUMMARY

In one aspect of the embodiments, there is provided a storage control apparatus including: a memory storing selection condition information relating to a selection condition for storage devices to construct a RAID, group information relating to groups to which the storage devices belong, and connection information indicating a connection configuration of the storage devices; and a processor configured to perform a procedure including: selecting storage devices that match the selection condition information from the storage devices; extracting groups to which the selected storage devices belong based on the group information; assigning group priorities, which indicate selection priorities in units of the groups of the storage devices, to the extracted groups based on the connection information; and selecting one storage device from each of the extracted groups in accordance with the group priorities until a predetermined number of storage devices have been selected.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 depicts one example of a candidate drive enclosure list according to the second embodiment;
FIG. 13 depicts an example of a first list according to the second embodiment;
FIG. 14 depicts an example of a second list according to the second embodiment;
FIG. 15 depicts an example of a third list according to the second embodiment;
FIG. 16 depicts an example of a fourth list according to the second embodiment;
FIG. 18 depicts an example of a hot spare candidate drive enclosure list according to the third embodiment;
FIG. 19 depicts one example of a weighted hot spare candidate drive enclosure list according to the third embodiment;
FIG. 20 depicts one example of a first hot spare list according to the third embodiment;
FIG. 21 depicts one example of a second hot spare list according to the third embodiment;
FIG. 22 depicts one example of a third hot spare list according to the third embodiment;
and
FIG. 23 depicts one example of a fourth hot spare list according to the third embodiment.

DESCRIPTION OF EMBODIMENTS

Figure 1:
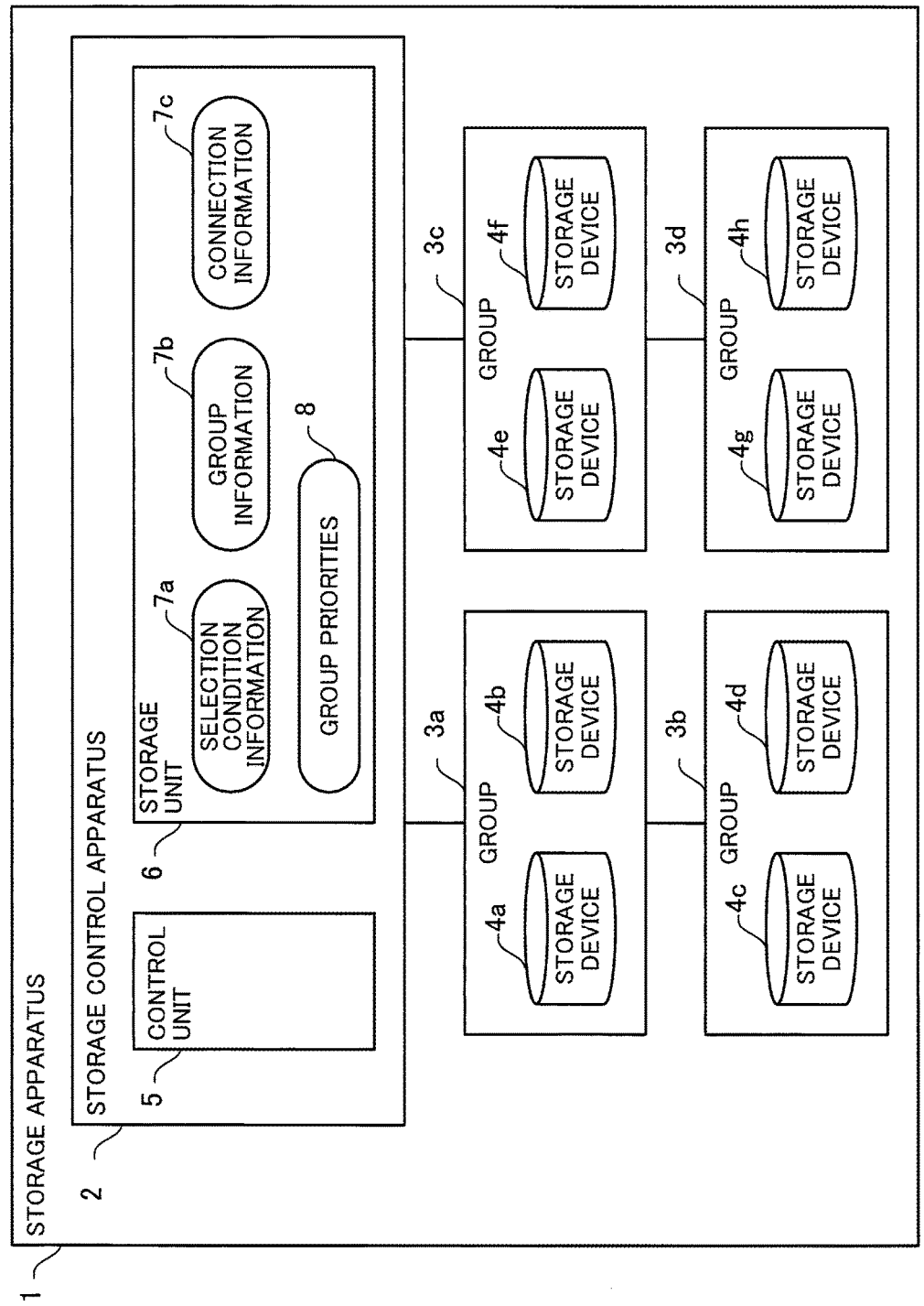
FIG. 1 depicts an example configuration of a storage apparatus according to a first embodiment.

Several embodiments will be described below with reference to the accompanying drawings, wherein like reference numerals refer to like elements throughout. Note that the following embodiments can be implemented in combination as appropriate.

First Embodiment

First, a storage apparatus according to a first embodiment will be described with reference to FIG. 1. FIG. 1 depicts an example configuration of a storage apparatus according to the first embodiment.

A storage apparatus 1 includes a storage control apparatus 2 and a plurality of storage devices 4a to 4h. The storage devices belong to groups (hereinafter "storage groups"). A storage group corresponds for example to a drive enclosure that is a housing which houses storage devices. Note that a "storage group" can be regarded as an attribute that is assigned to a storage device. A storage group may also belong to a storage group on a higher level, for which the storage group is a sub-group. For example, groups in units of drive enclosures may belong to higher-level groups in units of peers that are connected to the drive enclosures. As examples, such higher-level groups in units of connected peers may be groups in units of ports to which the drive enclosures are connected, groups in units of controller modules to which the drive enclosures are connected, and/or groups in units of controller enclosures to which the drive enclosures are connected.

The storage apparatus 1 uses RAID technology to protect data from failures. A storage device that constructs a RAID group is a device that stores data and/or parity (redundant codes) for the data.

The storage devices that construct a RAID group are selected from the storage devices 4a to 4h. The storage devices 4a to 4h may differ in terms of device type, capacity, access speed, and the like. Examples of device types of the storage devices are HDDs and SSDs. Example capacities of the storage devices are 500 GB and 10 TB. Example transfer speeds of storage devices are 8 Gbit/s and 12 Gbit/s.

The storage control apparatus 2 is an information processing apparatus and as one example may be a controller module included in the storage apparatus 1.

The storage control apparatus 2 includes a storage unit 6 and a control unit 5. The storage unit 6 is capable of storing selection condition information 7a, group information 7b, connection information 7c, and group priorities 8, and for example is a storage apparatus such as an HDD and/or various types of memory.

The selection condition information 7a is information relating to selection conditions for the storage devices to construct a RAID group. The selection condition information 7a includes a selection candidate narrowing condition for narrowing the storage devices that are selection candidates for constructing a RAID group and a selection candidate exclusion condition for excluding storage devices from the selection candidates for constructing a RAID group.

As examples, the selection candidate narrowing condition includes designations of the RAID level, the size of the RAID group, and identification information of storage devices. The selection candidate exclusion condition may include identification information of storage devices already in use and designations of failed storage devices and the like.

The group information 7b is information relating to which storage devices belong to which storage groups. The group information 7b includes information that associates identification information of storage devices with identification information of storage groups. As one example, the group information 7b is information that associates identification information of storage devices with identification information of the drive enclosures to which such storage devices belong.

The connection information 7c is information depicting the "connection configuration" of the storage devices. As one example, the connection information 7c includes information that associates identification information of storage devices with identification information of equipment to which the storage devices are connected. Examples of equipment to which the storage devices are connected are drive enclosures, controller modules, and ports of a controller enclosure. Note that the "connection configuration" of storage devices includes connections between storage devices and peers to which the storage devices are connected and also includes the connections between such connected peers themselves.

The control unit 5 selects the storage devices to construct a RAID group out of the provided storage devices as described below.

First, the control unit 5 selects storage devices that match the selection condition information 7a. As one example, the control unit 5 selects storage devices in accordance with the selection candidate narrowing condition and the selection candidate exclusion condition, resulting in the storage devices 4a, 4b, 4c, and 4e being selected.

The control unit 5 extracts the storage groups to which the selected storage devices belong based on the group information 7b. In this example, the control unit 5 extracts the storage group 3a to which the storage devices 4a and 4b belong, the storage group 3b to which the storage device 4c belongs, and the storage group 3c to which the storage device 4e belongs.

Based on the connection information 7c, the control unit 5 assigns the group priorities 8, which indicate selection priorities in units of storage groups, to the extracted storage groups. As one example, the control unit 5 assigns the first priority in the group priorities 8 to the group 3a, the second priority to the group 3c, and the third priority to the group 3b.

The control unit 5 selects one storage device from each of the extracted storage groups in accordance with the group priorities 8 until a predetermined number of storage devices have been selected. As one example, when two storage devices are selected, the control unit 5 selects the first storage device 4a from the group 3a and the second storage device 4e from the group 3c. Note that when three storage devices are selected, the control unit further selects the third storage device 4c from the group 3b.

In this way, the control unit 5 is capable of selecting a predetermined number of storage devices which are in different groups out of the extracted storage groups. By doing so, the storage apparatus 1 is capable of selecting the storage devices to construct a RAID group so that the storage devices are distributed between storage groups.

By selecting storage devices that are distributed between storage groups, it is possible for the storage apparatus 1 to reduce the number of storage devices that will simultaneously go out of use when there is a failure for a drive enclosure or the like. By doing so, when creating a RAID, it is easy for the storage apparatus 1 to select a highly stable combination of storage devices.

Second Embodiment

Figure 2:
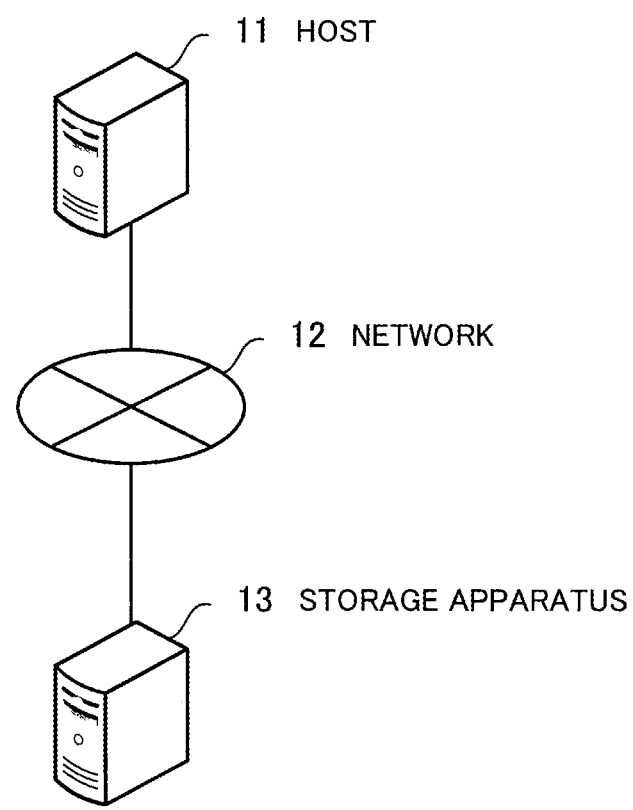
FIG. 2 depicts one example of a storage system according to a second embodiment.

Next, a storage system according to the second embodiment will be described with reference to FIG. 2. FIG. 2 depicts one example of a storage system according to the second embodiment.

A storage system 10 includes a host 11 and a storage apparatus 13 that is connected to the host 11 via a network 12. In the storage system 10, data is written into the storage apparatus 13 and read from the storage apparatus 13 in accordance with input/output requests made by the host 11. Note that the storage system 10 may include a plurality of hosts 11 and a plurality of storage apparatuses 13.

Figure 3:
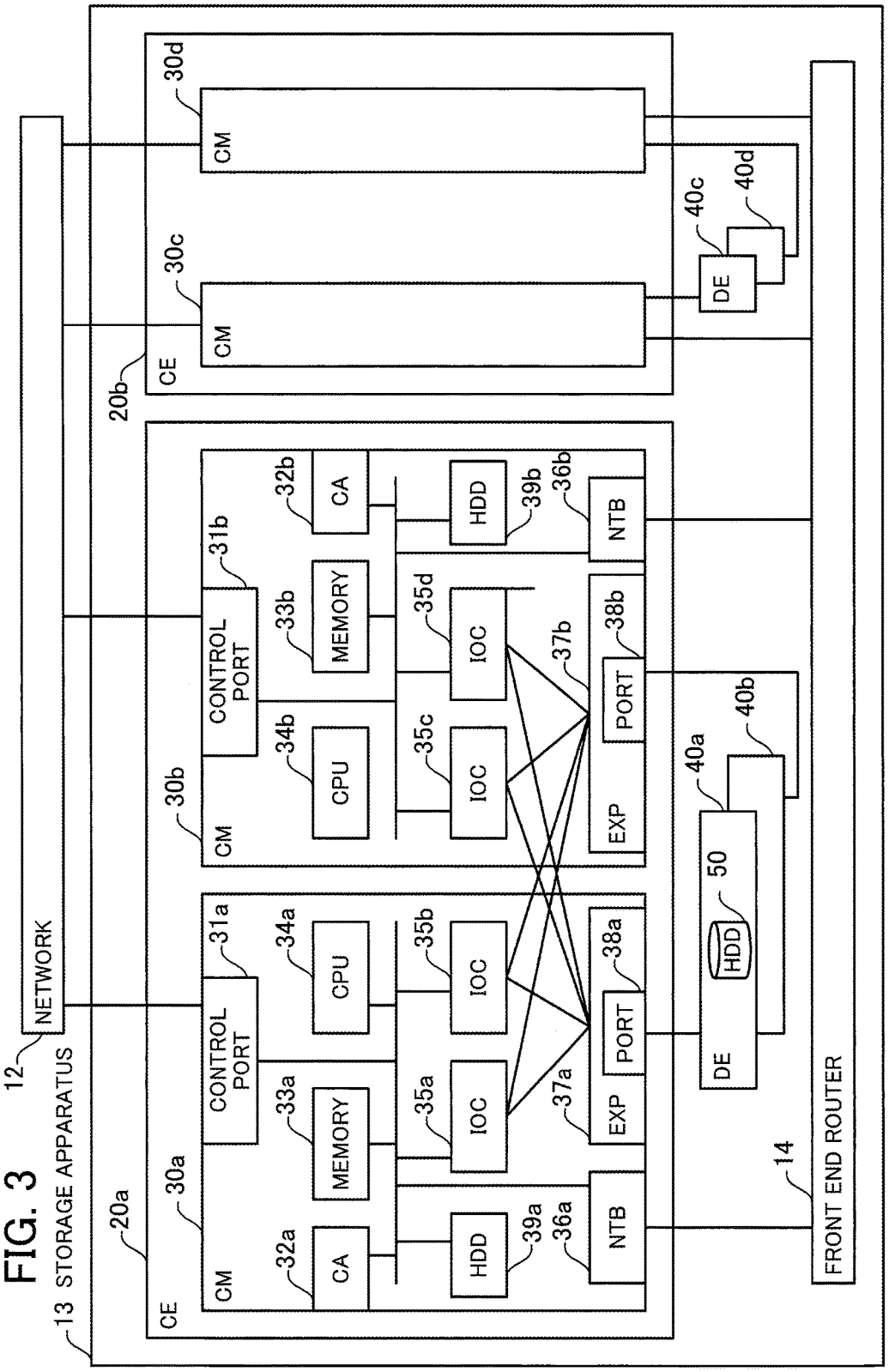
FIG. 3 depicts an example configuration of a storage apparatus according to the second embodiment.

Next, the configuration of the storage apparatus 13 will be described with reference to FIG. 3. FIG. 3 depicts one example configuration of a storage apparatus according to the second embodiment.

The storage apparatus 13 includes controller enclosures (CEs) 20a and 20b, drive enclosures (DEs) 40a, 40b, 40c, and 40d, and a front end router 14. A controller enclosure is a controller module housing apparatus that houses one or more controller modules. As examples, the controller enclosure 20a includes the controller modules (CMs) 30a and 30b and the controller enclosure 20b includes the controller modules 30c and 30d. A drive enclosure is a storage device housing apparatus (or "storage device housing") that houses one or more storage devices. As one example, the drive enclosure 40a houses an HDD 50.

The controller modules 30a, 30b, 30c, and 30d are connected to one another via the front end router 14. The controller modules 30a and 30b are connected to the drive enclosures 40a and 40b and the controller modules 30c and 30d are connected to the drive enclosures 40c and 40d.

The controller module 30a includes a control port 31a, a channel adapter (CA) 32a, a memory 33a, a Central Processing Unit (CPU) 34a, and input/output controllers (IOCs) 35a and 35b. The controller module 30a further includes a non-transparent bridge (NTB) 36a, an expander (EXP) 37a, and an HDD 39a. The controller module 30b includes a control port 31b, a channel adapter 32b, a memory 33b, a CPU 34b, input/output controllers 35c and 35d, a non-transparent bridge 36b, an expander 37b, and an HDD 39b. Note that the controller modules 30c and 30d have the same configuration as the controller modules 30a and 30b. The configuration of the controller module 30a will now be described as a representative example of the controller modules 30a, 30b, 30c, and 30d.

The controller module 30a is controlled by the CPU 34a. The memory 33a and a plurality of peripherals are connected via a bus to the CPU 34a. The CPU 34a may be a multicore processor that is constructed of two or more processors.

As examples, the CPU 34a may be a Micro Processing Unit (MPU), a Digital Signal Processor (DSP), an Application Specific Integrated Circuit (ASIC), or a Programmable Logic Device (PLD).

The memory 33a is used as a main storage apparatus of the controller module 30a. At least part of an Operating System (OS) program and/or application program executed by the CPU 34a is temporarily stored in the memory 33a. Various data used in processing by the CPU 34a is also stored in the memory 33a. The memory 33a also functions as a cache memory of the CPU 34a.

Examples of peripherals connected to the bus include the control port 31a, the channel adapter 32a, the HDD 39a, the input/output controllers 35a and 35b, and the non-transparent bridge 36a. Note that although a configuration where the expander 37a is connected to the bus via the input/output controllers 35a and 35b is illustrated, the expander 37a may be directly connected to the bus.

The control port 31a transmits and receives data to and from the host 11 via the network 12. Note that data may be transmitted to and received from the host 11 via the network 12 using the channel adapter 32a.

The HDD 39a magnetically reads and writes data onto internally held disks. The HDD 39a is used as an auxiliary storage apparatus of the controller module 30a. OS programs, application programs, and various data are stored in the HDD 39a. Note that as the auxiliary storage apparatus, it is also possible to use a semiconductor storage apparatus, such as flash memory.

The input/output controllers 35a and 35b control data inputs and outputs for the drive enclosures 40a and 40b. The non-transparent bridge 36a uses a Peripheral Component Interconnect Express (PCIe) interface to communicate with the controller modules 30a, 30b, 30c, and 30d via the front end router 14. The expander 37a includes a port 38a and transmits and receives data to and from the drive enclosures 40a and 40b via the port 38a.

With the hardware configuration described above, it is possible for the controller modules 30a, 30b, 30c, and 30d to realize a processing function of the storage apparatus 13 in the form of distributed processing. It is also possible for the controller modules 30a, 30b, 30c, and 30d to realize the processing function of the storage apparatus 13 with one controller module (for example, the controller module 30a) set as a master controller module.

As one example, the processing function of the storage apparatus 13 may be realized by the storage apparatus 13 executing a program recorded on a computer-readable recording medium. The program in which the processing content to be executed by the storage apparatus 13 is written can be recorded in advance on a variety of recording media. As one example, it is possible to store the program to be executed by the storage apparatus 13 in advance in an HDD. A CPU executes the program by loading at least part of the program in the HDD into a memory. The program to be executed by the storage apparatus 13 can be recorded on a portable recording medium such as an optical disk, a memory apparatus, or a memory card. The program stored on a portable recording medium becomes executable by being installed in an HDD, for example by control from the CPU. It is also possible for the CPU to directly read and execute the program from the portable recording medium.

Figure 4:
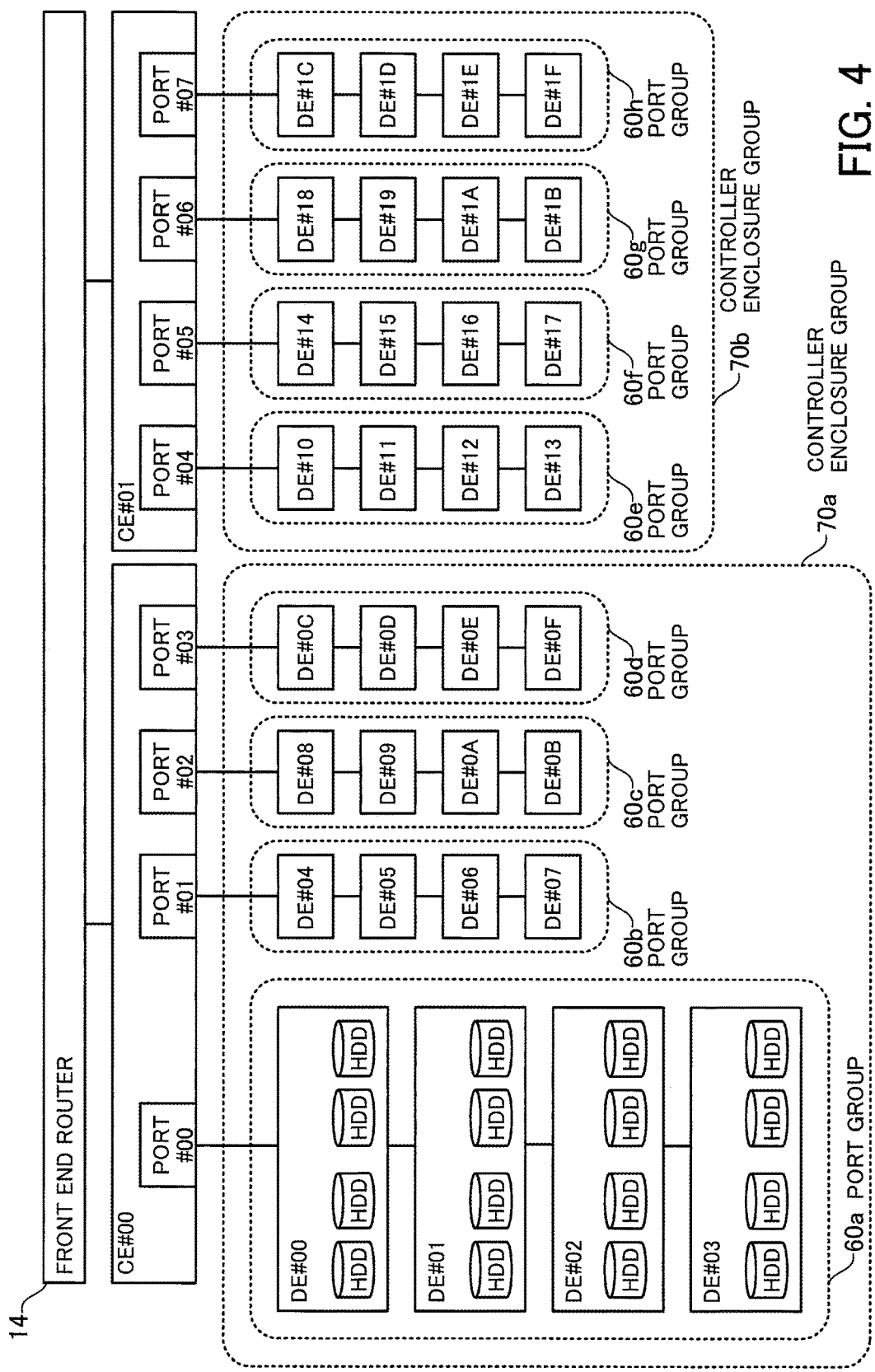
FIG. 4 depicts an example connection configuration of controller enclosures and drive enclosures according to the second embodiment.

Next, the connection configuration of the controller enclosures and the drive enclosures will be described with reference to FIG. 4. FIG. 4 depicts an example of the connection configuration of the controller enclosures and the drive enclosures according to the second embodiment.

To simplify the explanation of the connection configuration of the controller enclosures and drive enclosures, the controller enclosures, drive enclosures, and ports are illustrated using identification information in place of reference numerals. Note that the numbers "#nn" given after "CE" (Controller Enclosure), "DE" (Drive Enclosure), and "Port" are identification information for uniquely identifying controller enclosures, drive enclosures, and ports.

The front end router 14 is connected to CE#00 and CE#01. CE#00 has four ports numbered Port#00 to Port#03. CE#01 has four ports numbered Port#04 to Port#07.

Port #00 is connected to DE#00, DE#01, DE#02, and DE#03 in order of proximity to CE#00. Port #01 is connected to DE#04, DE#05, DE#06, and DE#07 in order of proximity to CE#00. Port #02 is connected to DE#08, DE#09, DE#0A, and DE#0B in order of proximity to CE#00. Port #03 is connected to DE#0C, DE#0, DE#0E, and DE#0F in order of proximity to CE#00.

Port #04 is connected to DE#10, DE#11, DE#12, and DE#13 in order of proximity to CE#01. Port #05 is connected to DE#14, DE#15, DE#16, and DE#17 in order of proximity to CE#01. Port #06 is connected to DE#18, DE#19, DE#1, and DE#1B in order of proximity to CE#01. Port #07 is connected to DE#1C, DE#1D, DE#1E, and DE#1F in order of proximity to CE#01.

The storage devices belong to storage groups (or "drive enclosure groups") in units (or "housing units") of the drive enclosures that house the storage devices. As one example, the four HDDs housed in DE#00 belong to the drive enclosure group of DE#00.

Since the ports of a controller enclosure are connected so as to be capable of communicating with a plurality of drive enclosures, the storage devices that belong to a drive enclosure group also belong to a storage group (or "port group") of the port to which the drive enclosures are connected (i.e., groups in units of connection series). As one example, the storage devices housed in the four drive enclosures numbered DE#00 to DE#03 that are connected to Port#00 belong to the port group 60a of Port#00. In the same way, the storage devices housed in DE#00 to DE#03 belong to the port group 60b of Port#01, the storage devices housed in DE#08 to DE#0B belong to the port group 60c of Port#02, and the storage devices housed in DE#0C to DE#0F belong to the port group 60d of Port#03. The storage devices housed in DE#10 to DE#13 belong to the port group 60e of Port#04. The storage devices housed in DE#14 to DE#7 belong to the port group 60f of Port#05. The storage devices housed in DE#18 to DE#1B belong to the port group 60g of Port#06. The storage devices housed in DE#1C to DE#1F belong to the port group 60h of Port#07.

Also, since the control system is divided between the controller enclosures that are in charge of the drive enclosures to be controlled, the storage devices that belong to a port group also belong to a storage group (or "controller enclosure group") for the controller enclosure that is equipped with the port in question (i.e., groups in units of assigned controller or control series). As one example, the storage devices that belong to the port group 60a to the port group 60d belong to the controller enclosure group 70a of CE#00. In the same way, the storage devices that belong to the port group 60e to the port group 60h belong to the controller enclosure group 70b of CE#01. Note that the relationships between groups described here is merely one example and it is also possible for groups to belong to a group on a higher level and for groups to be included in groups on a lower level. The grouping of storage devices is not limited to connection-based relationships and it is possible for the system administrator to set groups or for the units of groups to be set according to other methods.

Figure 5:
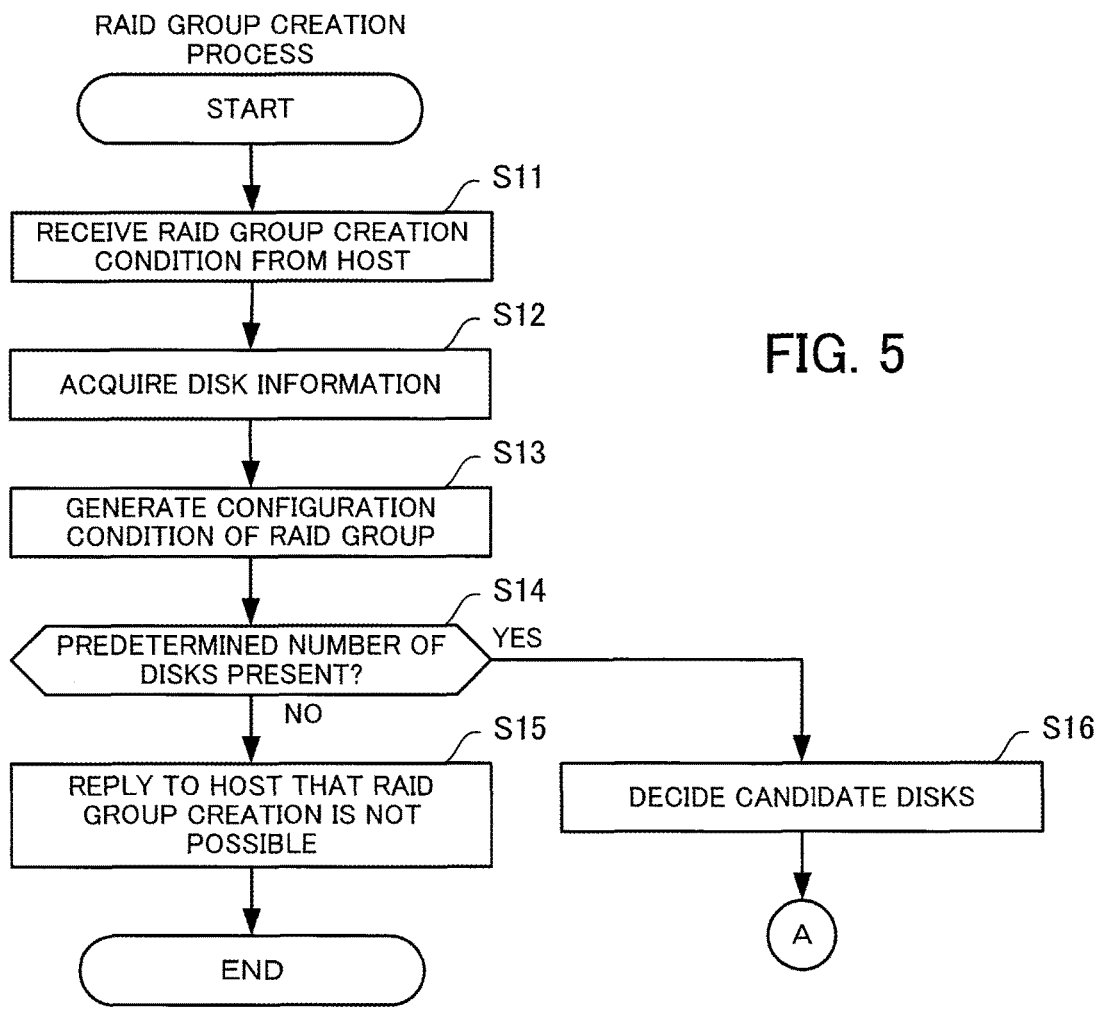
FIG. 5 is part one of a flowchart of a RAID group creation process according to the second embodiment.
Figure 6:
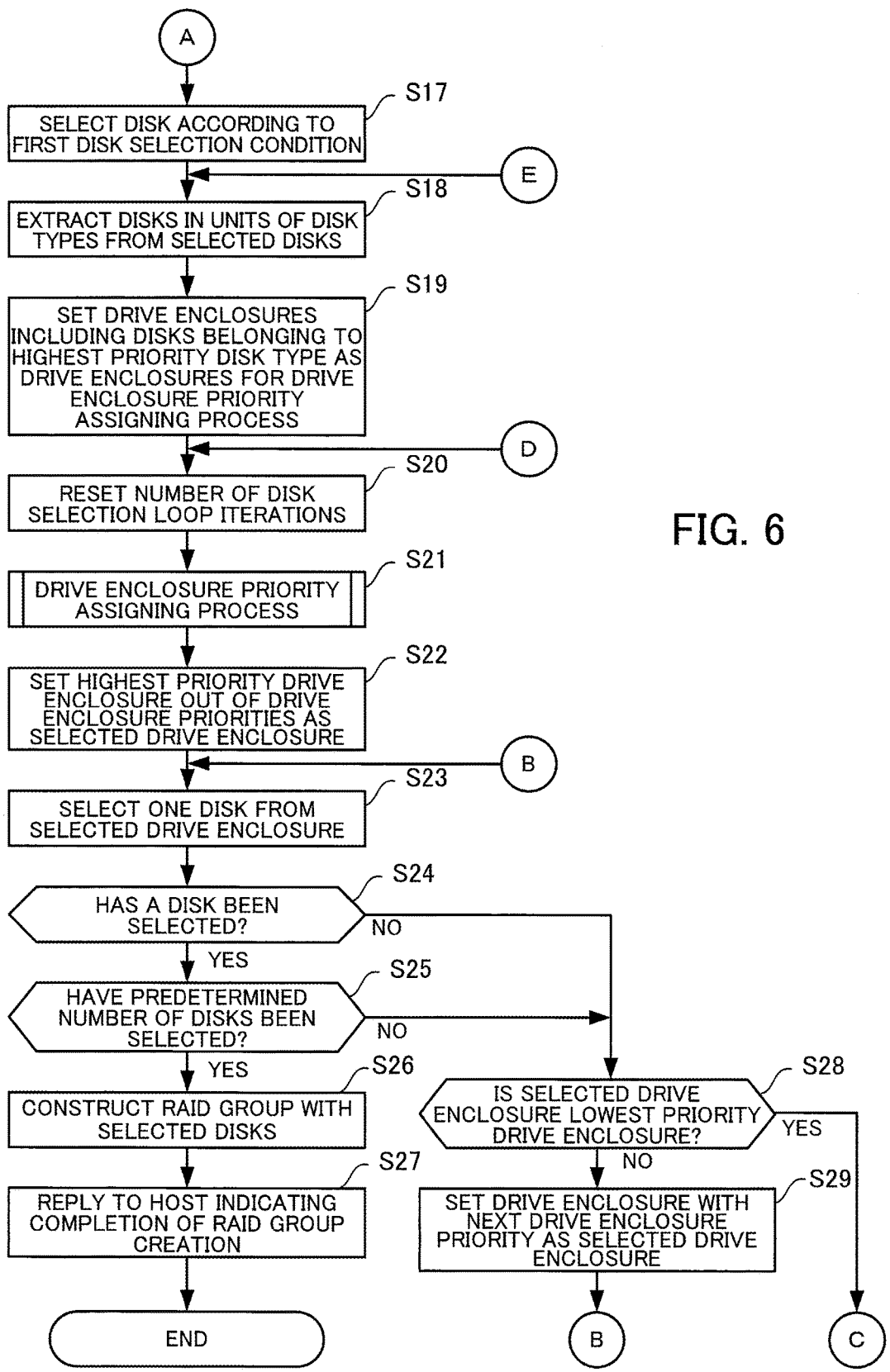
FIG. 6 is part two of the flowchart of the RAID group creation process according to the second embodiment.
Figure 7:
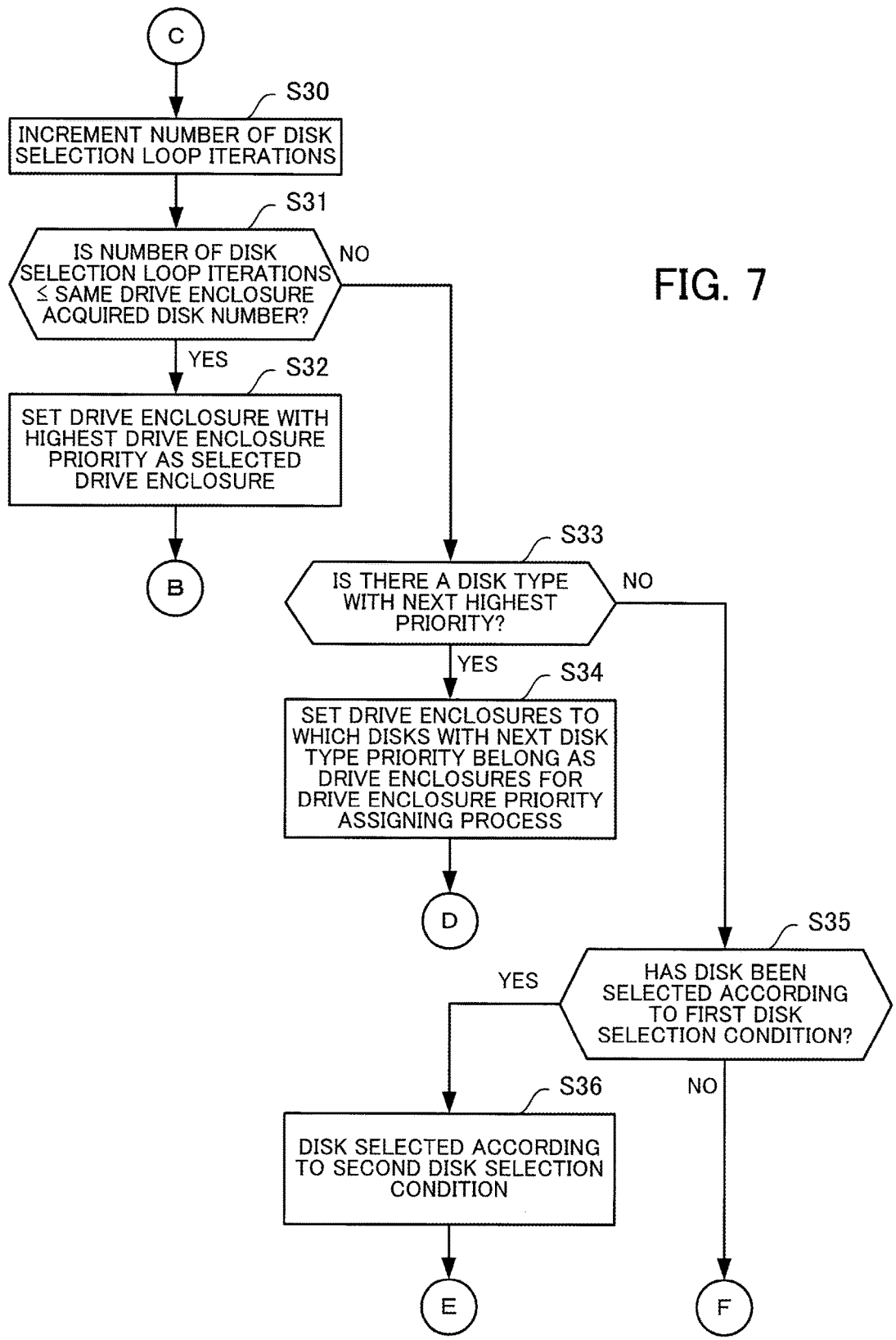
FIG. 7 is part three of the flowchart of the RAID group creation process according to the second embodiment.
Figure 8:
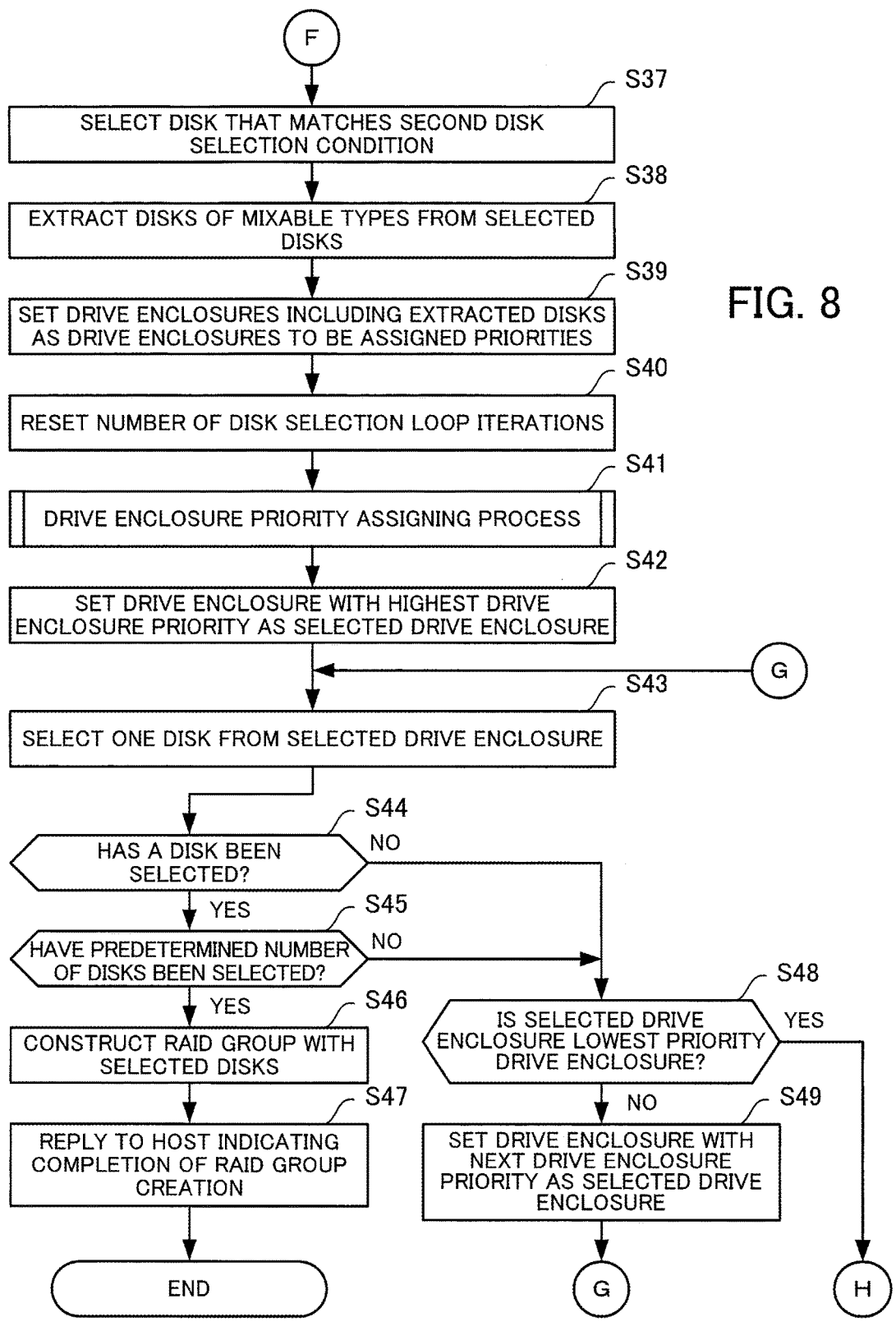
FIG. 8 is part four of the flowchart of the RAID group creation process according to the second embodiment.
Figure 9:
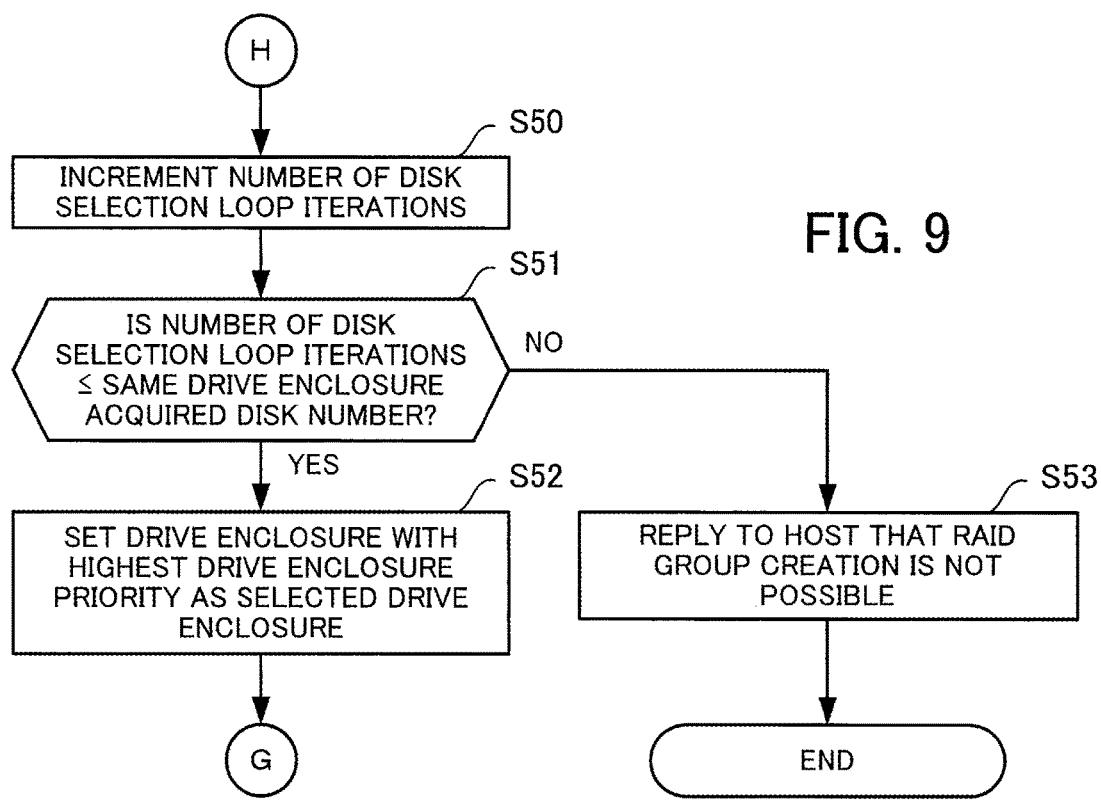
FIG. 9 is part five of the flowchart of the RAID group creation process according to the second embodiment.

Next, a RAID group creation process will be described with reference to FIG. 5 to FIG. 9. FIG. 5 is part one of a flowchart of the RAID group creation process according to the second embodiment. FIG. 6 is part two of the flowchart of the RAID group creation process according to the second embodiment. FIG. 7 is part three of the flowchart of the RAID group creation process according to the second embodiment. FIG. 8 is part four of the flowchart of the RAID group creation process according to the second embodiment. FIG. 9 is part five of the flowchart of the RAID group creation process according to the second embodiment.

The RAID group creation process is a process where the storage apparatus 13 creates a RAID group. A control unit of the storage apparatus 13 (for example, the CPU 34a when the master controller module is the controller module 30a) receives an instruction to create a RAID group from the host 11 and executes the RAID group creation process.

(Step S11) The control unit receives RAID group creation conditions from the host 11. The RAID group creation conditions are information indicating the creation conditions for a RAID group. As one example, the RAID group creation conditions include designations of RAID level (as one example, RAID 5), RAID size (for example, 500 TB), disk (storage device) type (for example, distinguishing between HDD and SDD), and/or specific disks.

(Step S12) The control unit acquires disk information (storage device information). The disk information is information relating to a disk of the storage apparatus 13 and is shared by the controller modules. The disk information includes the drive enclosure to which a disk belongs, a distinction of whether the disk is in use or is unused, a distinction of whether the disk is normal or has failed, a disk type, disk size (storage capacity), the number of disks, and the like.

(Step S13) The control unit generates, from the RAID group creation conditions, the disk information, and information set in advance, RAID group configuration conditions in which the RAID group creation conditions are specifically expressed using disk information. The RAID group configuration conditions include information such as the disk size, the number of disks, and the number of disks that can be acquired from the same drive enclosure (or "same drive enclosure acquired disk number").

Note that when a RAID level is not set in the RAID group creation conditions, the control unit decides the RAID group in accordance with RAID level priorities set in advance. As one example, in the RAID level priorities, the first priority is RAID 1+0, the second priority is RAID 1, the third priority is RAID 5, the fourth priority is RAID 6, and the fifth priority is RAID D6-FR. When a RAID size is designated in the RAID group creation conditions, the control unit calculates the disk size and number of disks using the disks that are recommended for each RAID level. When the RAID size is not designated in the RAID group creation conditions, the control unit calculates the number of disks that minimizes the size of the created RAID groups for each RAID level using the disks that are recommended for each RAID level. When specific disks are not designated in the RAID group creation conditions, the control unit sets all of the usable disks as candidates for creation of a RAID group.

(Step S14) The control unit determines whether the number of disks (or "predetermined number of disks") calculated in step S13 is present in the storage apparatus 13, proceeds to step S16 when the predetermined number of disks are present, and proceeds to step S15 when the predetermined number of disks are not present. As one example, the control unit extracts disks that have been specifically designated by the RAID group creation conditions and are unused disks included in the disk information. From the extracted unused disks, the control unit finds the number of disks with the same size as or a larger size than the disk size included in the RAID group creation conditions. When the number of disks is at least equal to the calculated predetermined number of disks, the control unit determines that the predetermined number of disks are present.

(Step S15) The control unit replies to the host 11 that RAID group creation is not possible and ends the RAID group creation process.

(Step S16) The control unit chooses disks that satisfy the configuration conditions as candidate disks for the member disks to create the RAID group and proceeds to step S17.

(Step S17) The control unit acquires disk selection conditions that have been set and selects disks that satisfy a first disk selection condition out of the disk selection conditions from the candidate disks. The disk selection conditions are conditions for selecting disks for creating a RAID group from the viewpoints of disk usage efficiency and performance efficiency. The disk selection conditions include a first disk selection condition and a second disk selection condition. As one example, the first disk selection condition is a condition that selects disks that are unused (with hot spare disks excluded) and have the same size as the disk size in the configuration conditions. The second disk selection condition is for example a condition which, in addition to the first disk selection condition, selects disks that have a larger size than the disk size in the configuration conditions.

(Step S18) The control unit extracts disks in units of disk types from the disks selected in step S17. As one example, when a plurality of different disk types are present in the storage apparatus 13, the control unit extracts disks separately for each disk type.

(Step S19) The control unit acquires disk type priorities that have been set and sets drive enclosures in which disks belonging to the disk type with the highest priority in the disk type priorities are housed as priority-assigned drive enclosures. A priority-assigned drive enclosure is a drive enclosure to be subjected to a drive enclosure priority assigning process, described later. The drive type priorities indicate the priority of each disk type when creating a RAID group. As one example, in the drive enclosure priorities, online Serial Attached SCSI (SAS (SCSI: Small Computer System Interface)) is the first priority, nearline SAS is the second priority, SSD is the third priority, and online SAS Self Encrypting Drive (SED) is the fourth priority.

(Step S20) The control unit resets the number of disk selection loop iterations to "1". The number of disk selection loop iterations is the number of times disks are selected from the highest-priority drive enclosure in the drive enclosure priorities to the lowest-priority drive enclosure in accordance with drive enclosure priorities assigned by the drive enclosure priority assigning process.

(Step S21) The control unit executes the drive enclosure priority assigning process. The drive enclosure priority assigning process is a process that assigns priorities (drive enclosure priorities) to drive enclosures for selecting disks (or "member disks") to construct a RAID group. The drive enclosure priority assigning process will be described later with reference to FIG. 11.

(Step S22) The control unit sets the drive enclosure with the highest priority in the drive enclosure priorities as the drive enclosure (or "selected drive enclosure") for selecting a member disk to construct a RAID group.

(Step S23) The control unit selects one disk from the selected drive enclosure as a member disk to construct a RAID group.

(Step S24) The control unit determines whether a disk could be selected in step S23. When a disk was selected, the control unit proceeds to step S25 and when no disk was selected, the control unit proceeds to step S28.

(Step S25) The control unit determines whether the predetermined number of disks have been selected. When the predetermined number of disks have been selected, the control unit proceeds to step S26, while when the predetermined number of disks have not been selected, the control unit proceeds to step S28.

(Step S26) The control unit constructs a RAID group with the disks selected in step S23 as the member disks.

(Step S27) The control unit replies to the host 11 to indicate the completion of RAID group creation and ends the RAID group creation process.

(Step S28) The control unit determines whether the selected drive enclosure is the lowest priority drive enclosure in the drive enclosure priorities. When the selected drive enclosure is not the lowest priority drive enclosure, the control unit proceeds to step S29, while when the selected drive enclosure is the lowest priority drive enclosure, the control unit proceeds to step S30.

(Step S29) The control unit sets the drive enclosure with the next highest drive enclosure priority as the selected drive enclosure and returns to step S23.

In this way, by extracting disks based on the first disk selection condition, the control unit is capable of constructing a RAID group using disks of the same size, even in the storage apparatus 13 that includes disks of different sizes. Also, by extracting disks for each disk type and subjecting the drive enclosures in question to the drive enclosure priority assigning process, the control unit is capable of constructing a RAID group of disks of the same type, even in the storage apparatus 13 that includes disks of different types.

(Step S30) The control unit adds one to the number of disk selection loop iterations. As one example, when the number of disk selection loop iterations is "1", the control unit sets the number of disk selection loop iterations at "2".

(Step S31) The control unit compares the number of disk selection loop iterations with the same drive enclosure acquired disk number. When the number of disk selection loop iterations is the same as or fewer than the same drive enclosure acquired disk number, the control unit proceeds to step S32, while when the number of disk selection loop iterations is more than the same drive enclosure acquired disk number, the control unit proceeds to step S33.

(Step S32) The control unit sets the highest priority drive enclosure in the drive enclosure priorities as the selected drive enclosure and returns to step S23.

(Step S33) The control unit determines whether there is a disk type with the next highest priority in the drive type priorities. When there is a disk type with the next highest priority, the control unit proceeds to step S34, while when there is no disk type with the next highest priority, the control unit proceeds to step S35.

(Step S34) The control unit excludes drive enclosures to which disks of the disk type with the presently selected disk type priority belong from consideration as the selected drive enclosure. After excluding such drive enclosures, the control unit returns to step S20 with drive enclosures to which disks of the disk type with the next disk type priority belong as the new selected drive enclosures for the drive enclosure priority assigning process.

(Step S35) The control unit determines whether a disk has been selected according to the first disk selection condition. When a disk has been selected according to the first disk selection condition, the control unit proceeds to step S36, while when a disk has not been selected according to the first disk selection condition, the control unit proceeds to step S37.

(Step S36) The control unit selects, from the candidate disks, disks that satisfy the second disk selection condition having first excluded disks that were selected according to the first disk selection condition from the selection, and then returns to step S18.

(Step S37) The control unit selects disks that satisfy the second disk selection condition out of the disk selection conditions having first excluded the disks that were selected according to the first disk selection condition from the selection.

(Step S38) Out of the selected disks, the control unit extracts disks of disk types for which mixing with other disk types is tolerated. As one example, when the mixing of online SAS and nearline SAS in the same RAID group is tolerated, the control unit extracts disks of such two disk types.

(Step S39) The control unit sets the drive enclosures in which the disks extracted in step S38 are included as selected drive enclosures for the drive enclosure priority assigning process.

(Step S40) The control unit resets the number of disk selection loop iterations to "1".

(Step S41) The control unit executes the drive enclosure priority assigning process.

(Step S42) The control unit sets the drive enclosure with the highest position in the drive enclosure priorities as the selected drive enclosure.

(Step S43) The control unit selects one disk from the selected drive enclosure as a member disk to construct a RAID group.

(Step S44) The control unit determines whether a disk was selected in step S43. When a disk was selected, the control unit proceeds to step S45, while when a disk could not be selected, the control unit proceeds to step S48.

(Step S45) The control unit determines whether the predetermined number of disks have been selected. When the predetermined number of disks have been selected, the control unit proceeds to step S46, while when the predetermined number of disks have not been selected, the control unit proceeds to step S48.

(Step S46) The control unit constructs a RAID group with the disks selected in step S43 as the member disks.

(Step S47) The control unit replies to the host 11 to indicate the completion of RAID group creation and ends the RAID group creation process.

(Step S48) The control unit determines whether the selected drive enclosure is the lowest priority drive enclosure in the drive enclosure priorities. When the selected drive enclosure is not the lowest priority drive enclosure, the control unit proceeds to step S49, while when the selected drive enclosure is the lowest priority drive enclosure, the control unit proceeds to step S50.

(Step S49) The control unit sets the drive enclosure with the next highest drive enclosure priority as the selected drive enclosure and then proceeds to step S43.

In this way, even when the storage apparatus 13 includes disks of different sizes and types, it is possible to construct a RAID group using a combination of such disks. Accordingly, it is possible to easily construct a RAID group even when an existing disk in the storage apparatus 13 has been replaced with a large capacity disk or a failed existing disk has been replaced with a new disk, which facilitates expansion and maintenance of the storage apparatus 13.

(Step S50) The control unit adds one to the number of disk selection loop iterations. As one example, when the number of disk selection loop iterations is "1", the control unit sets the number of disk selection loop iterations at "2".

(Step S51) The control unit compares the number of disk selection loop iterations with the same drive enclosure acquired disk number. When the number of disk selection loop iterations is the same or fewer than the same drive enclosure acquired disk number, the control unit proceeds to step S52, while when the number of disk selection loop iterations is more than the same drive enclosure acquired disk number, the control unit proceeds to step S53.

(Step S52) The control unit sets the highest priority drive enclosure in the drive enclosure priorities as the selected drive enclosure and returns to step S43.

(Step S53) The control unit replies to the host 11 that RAID group creation is not possible and ends the RAID group creation process.

Figure 10:
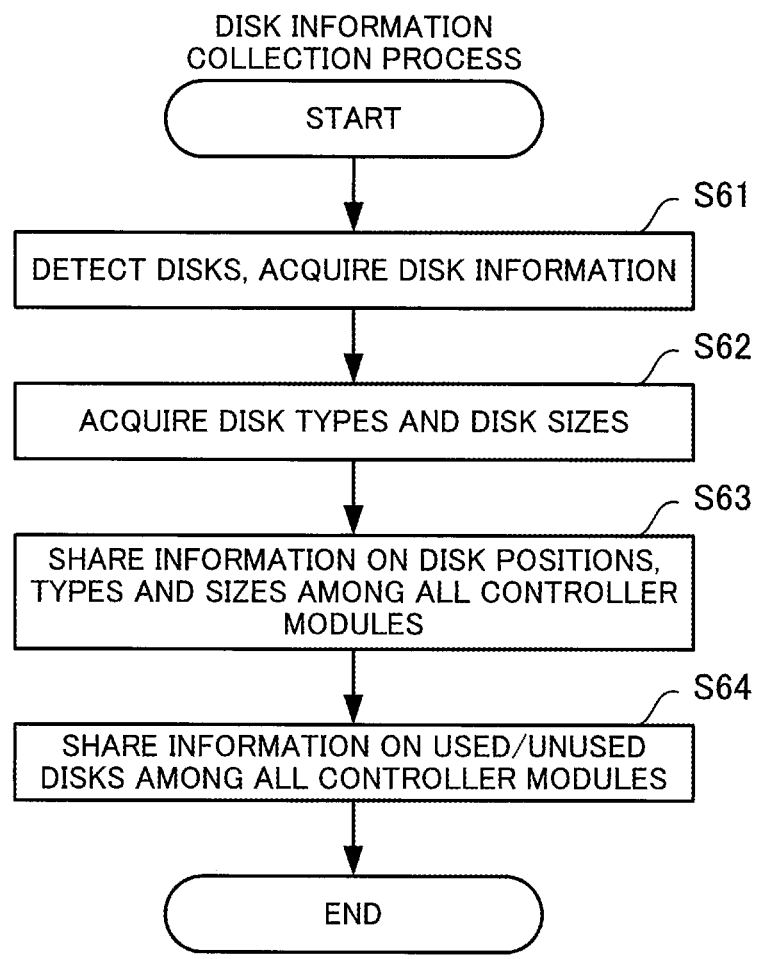
FIG. 10 is a flowchart depicting a disk information collection process according to the second embodiment.

Next, a disk information collection process according to the second embodiment will be described with reference to FIG. 10. FIG. 10 is a flowchart depicting the disk information collection process according to the second embodiment.

The disk information collection process is a process where the storage apparatus 13 collects disk information. The disk information collection process is executed in three scenarios, when the storage apparatus 13 is turned on, when the configuration of the disks is changed, and when a controller module has been added, replaced, or restarted. When the storage apparatus 13 is turned on, the disk information collection process is executed by the control unit (CPU) of every controller module included in the storage apparatus 13. When the configuration of disks is changed (as examples, when disks are added, removed, or replaced), the disk information collection process is executed by the control units (CPUs) of the controller modules connected to the disks where the configuration has changed. When a controller module has been added, replaced, or restarted, the disk information collection process is executed by the control unit (CPU) of the controller module that has been added, replaced, or restarted. When a controller module has been removed, the disk information collection process is executed by the control unit (CPU) of a controller module that has detected the removal of the controller module.

(Step S61) The control unit detects the disks connected to the controller module in question and acquires information on disk positions. As one example, the control unit detects disks by a discover function and/or a broadcast change function defined by a SAS interface or the like and acquires disk information. By detecting disks, the control unit is capable of acquiring information on drive enclosures that house the detected disks, the ports connected to the storage devices, and the controller enclosures connected to the storage devices. By doing so, the control unit is capable of generating drive enclosure groups, port groups, and controller enclosure groups.

(Step S62) The control unit issues SCSI commands to the detected disks and acquires the disk types and disk sizes. Note that the disk types and the disk sizes are examples of information acquired by the control unit, and it is also possible to acquire information on whether there is a disk failure.

(Step S63) The control unit notifies each controller module of the information acquired in step S61 and step S62 to share the information between the controller modules.

(Step S64) The control unit determines the usage states of disks (i.e., whether disks are used or unused) from the information acquired in step S61 and S62 and information shared in advance between the controller modules and notifies other controller modules of the usage states of disks to share the information with other controller modules. As examples, by sharing information capable of specifying member disks that construct a RAID group and hot spare disks between the controller modules, it is possible for control units to determine the usage states of disks.

In this way, the storage apparatus 13 is capable of collecting disk information in keeping with changes in the connection configuration. By doing so, the storage apparatus 13 is capable of creating RAID groups in accordance with changes in configuration.

Figure 11:
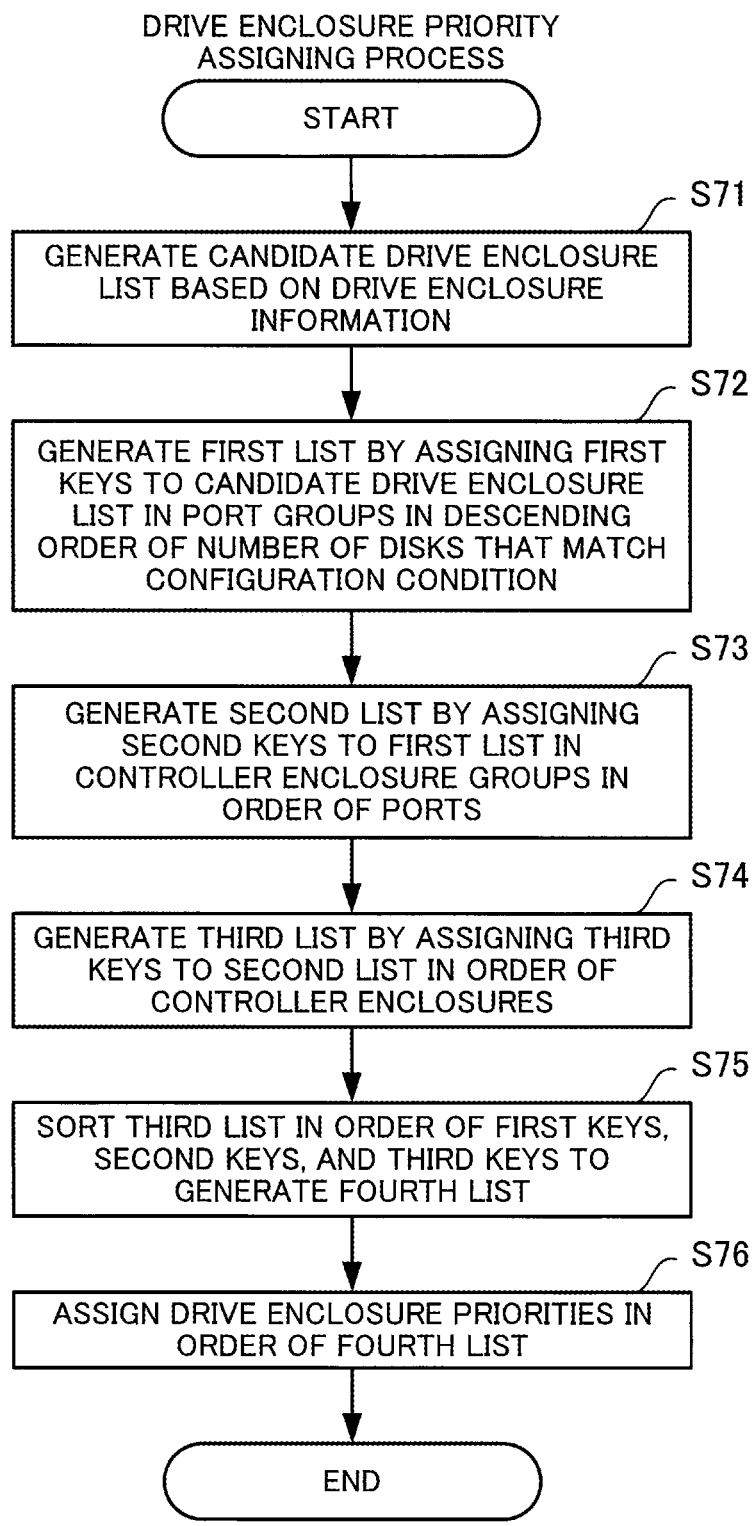
FIG. 11 is a flowchart depicting a drive enclosure priority assigning process according to the second embodiment.

Next, the drive enclosure priority assigning process according to the second embodiment will be described with reference to FIG. 11. FIG. 11 is a flowchart depicting the drive enclosure priority assigning process according to the second embodiment.

The drive enclosure priority assigning process is a process that assigns priorities (drive enclosure priorities) to drive enclosures when selecting the member disks of a RAID group. The drive enclosure priority assigning process is a process executed by a control unit of the storage apparatus 13 (for example, the CPU 34a when the master controller module is the controller module 30a) in step S21 and step S41 of the RAID group creation process.

(Step S71) The control unit generates a candidate drive enclosure list from the selected drive enclosures. The candidate drive enclosure list is a list of drive enclosures that are candidates for acquiring the member disks to construct a RAID group. The candidate drive enclosure list is information produced by listing up drive enclosures that house usable disks out of all of the drive enclosures.

(Step S72) The control unit generates a first list by assigning first keys to the candidate drive enclosure list. The first keys are assigned to drive enclosures (drive enclosure groups) listed up in the candidate drive enclosure list. The first keys are information (for example, . . . ) which makes it possible to sort the drive enclosures in a port group in descending order of the number of disks that match the configuration conditions which are housed in such drive enclosures.

In this way, by assigning the first keys to the drive enclosures in descending order of the number of disks that match the configuration conditions, the control unit is capable of having disks selected from drive enclosures with a large number of disks that match the configuration condition. By doing so, the control unit is capable of selecting disks with consideration to redundancy, even in cases where a large number of RAID groups have been created and the number of unused disks is low. Note that for drive enclosures where the number of disks that match the configuration condition is the same, the control unit assigns the first keys in order of proximity of the connection to a port.

(Step S73) The control unit generates a second list by assigning second keys to the first list. The second keys are assigned to ports (port groups) listed up in the candidate drive enclosure list. The second keys are information (for example, "0", "1", "2", "3", . . . ) that make it possible to sort the ports in a controller enclosure group in order of the identification information.

(Step S74) The control unit generates a third list by assigning third keys to the second list. The third keys are assigned to the controller enclosures (controller enclosure groups) listed up in the candidate drive enclosure list. The third key is information (for example, "0", "1", "2", "3", . . . ) that makes it possible to sort the controller enclosure groups in order of the identification information.

(Step S75) The control unit sorts the third list in order of the first keys, the second keys, and the third keys to generate a fourth list.

(Step S76) The control unit assigns drive enclosure priorities to the drive enclosures in order of the fourth list.

Next, the candidate drive enclosure list according to the second embodiment will be described with reference to FIG. 12. FIG. 12 depicts one example of a candidate drive enclosure list according to the second embodiment.

The candidate drive enclosure list 300 is information generated by step S71 of the drive enclosure priority assigning process. The candidate drive enclosure list 300 is a list of drive enclosures provided in the storage apparatus 13 to make it possible to specify the controller enclosures to which drive enclosures are connected, the ports to which drive enclosures are connected, and the connection order of the drive enclosures to the ports. In the candidate drive enclosure list 300, candidate drive enclosures are unshaded and non-candidate drive enclosures are shaded. As one example, DE#00 is a candidate drive enclosure that is connected to CE#00 and is connected to Port#00 with the connection order number "0". DE#1D is a non-candidate drive enclosure that is connected to the CE#01 and is connected to Port#07 with the connection order number "1".

Next, the first list according to the second embodiment will be described with reference to FIG. 13. FIG. 13 depicts an example of the first list according to the second embodiment. The first list 301 is information generated by step S72 of the drive enclosure priority assigning process. The first list 301 indicates candidate drive enclosures that have been assigned the first keys. The first list 301 indicates the first keys as [n] in the columns to the right of the candidate drive enclosures. The first keys are assigned to candidate drive enclosures in port units.

As one example, since DE#00 and DE#02 are connected to Port#00 as candidate drive enclosures, the first key of DE#00 is "0" and the first key of DE#02 is "1". In the same way, since DE#10, DE#12, and DE#13 are connected to Port#04 as candidate drive enclosures, the first key of DE#10 is "0", the first key of DE#12 is "1", and the first key of DE#13 is "2".

Next, the second list according to the second embodiment will be described with reference to FIG. 14. FIG. 14 depicts an example of the second list according to the second embodiment. The second list 302 is information generated by step S73 of the drive enclosure priority assigning process. The second list 302 indicates ports that have been assigned a second key. The second list 302 indicates the second keys as (n) to the right of the ports. The second keys are assigned to ports in controller enclosure units.

As one example, since CE#00 has three ports (Port#00, Port#02, and Port#03) connected to the candidate drive enclosures, the second key of Port#00 is "0", the second key of Port#02 is "1", and the second key of Port#03 is "2". In the same way, CE#01 has four ports (Port#04, Port#05, Port#06, and Port#07 ) connected to the candidate drive enclosures. Accordingly, the second key of Port#04 is "0", the second key of Port#05 is "1", the second key of Port#06 is "2", and the second key of Port#07 is "3".

Next, the third list according to the second embodiment will be described with reference to FIG. 15. FIG. 15 depicts an example of the third list according to the second embodiment. The third list 303 is information generated by step S74 of the drive enclosure priority assigning process. The third list 303 indicates controller enclosures that have been assigned a third key. The third list 303 indicates the third keys as <n> in the columns to the right of the controller enclosures. The third keys are assigned to controller enclosures in storage apparatus units.

As one example, since the storage apparatus 13 has CE#00 and CE#01, the third key of CE#00 is "0" and the third key of CE#01 is "1".

Next, the fourth list according to the second embodiment will be described with reference to FIG. 16. FIG. 16 depicts an example of the fourth list according to the second embodiment. The fourth list 304 is information generated by step S76 in the drive enclosure priority assigning process. The fourth list 304 depicts a list of candidate drive enclosures where the third list 303 has been rearranged using the first key, the second key, and the third key and drive enclosure priorities are assigned in ascending order. Note that in the fourth list 304, when there is no drive enclosure that corresponds to a combination of a first key, a second key, and a third key, the candidate drive enclosure and drive enclosure priority are indicated as "-".

The method by which the storage apparatus 13 selects the member disks using the fourth list 304 will now be described. In this example, the storage apparatus selects sixteen member disks to construct a RAID group.

The storage apparatus 13 selects the first disk from DE#00 that has the drive enclosure priority "1". Next, the storage apparatus 13 selects the second disk from DE#10 that has the drive enclosure priority "2". In the same way, the storage apparatus 13 selects the fifteenth disk from DE#17 that has the drive enclosure priority "15". Since the predetermined number of disks is not reached even after a disk has been selected from DE#17 that has the lowest drive enclosure priority of "15", the storage apparatus 13 selects the sixteenth disk from DE#00 with the highest drive enclosure priority of "1". By doing so, it is possible for the storage apparatus 13 to select sixteen member disks in accordance with the drive enclosure priorities.

When it is not possible to select a disk from a drive enclosure in the disk selection process, the storage apparatus 13 selects a disk from the drive enclosure that has been assigned the next drive enclosure priority following the drive enclosure where a disk could not be selected. As one example, when it is not possible to select a disk from DE#16 that has the drive enclosure priority "10", the storage apparatus 13 selects one disk from DE#0E with the next drive enclosure priority "11" which follows DE#16.

In this way, the storage apparatus 13 assigns drive enclosure priorities with consideration to each of the drive enclosure groups, the port groups, and the controller enclosure groups, which makes it possible to select the member disks to construct a RAID group with consideration to redundancy and without the member disks being biased toward the same drive enclosure, the same port group, and the same controller enclosure group.

Since the storage apparatus 13 divides the plurality of drive enclosures into groups and assigns priorities for selecting disks, it becomes easy to select disks that are distributed among the groups. As a result, when the storage apparatus 13 constructs a RAID group, it is possible to select disks without the disks being biased toward the same groups.

If the storage apparatus 13 selected disks mainly from the same groups, there would be an increased probability of a plurality of disks failing at the same time due to a drive enclosure failure or input/output errors on appliance-connecting cables. This means that if the storage apparatus 13 selected member disks to construct a RAID group mainly from the same groups, any failures would have a large effect on the RAID group.

According to the present embodiment, the storage apparatus 13 is capable of reducing the influence of failures by selecting disks that are distributed among groups.

By doing so, the storage apparatus 13 is capable of selecting a highly stable combination of disks when constructing a RAID group.

Third Embodiment

Next, a method of selecting a hot spare disk according to a third embodiment will be described with reference to FIG. 17 to FIG. 23. Since the configurations of the storage system 10, the storage apparatus 13, and the like are the same as in the second embodiment, description thereof is omitted. Note the hot spare disk is a disk used as a spare disk when a member disk that constructs a RAID group has failed.

Figure 17:
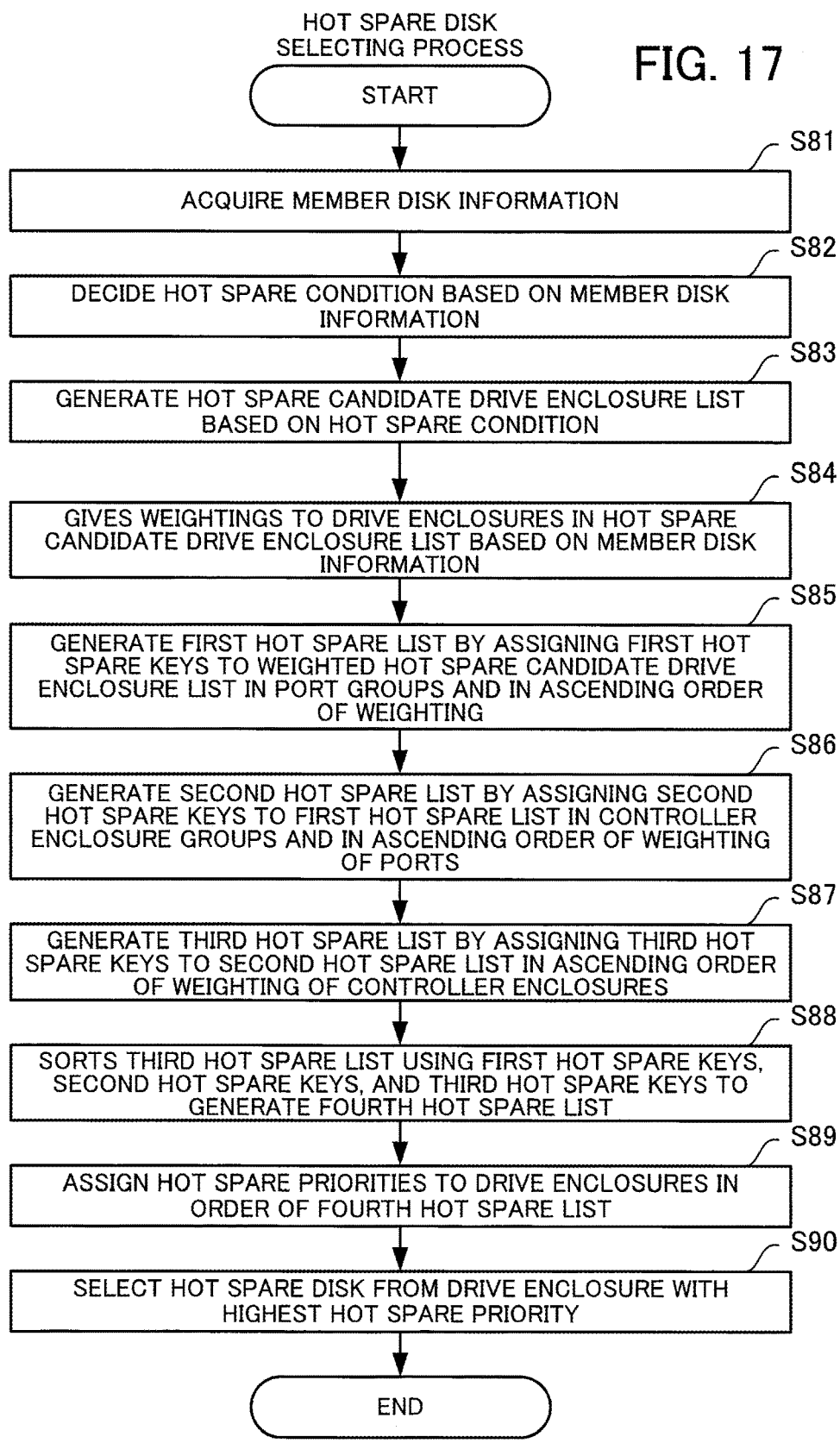
FIG. 17 is a flowchart depicting a hot spare disk selecting process according to a third embodiment.

First, a hot spare disk selecting process according to the third embodiment will be described with reference to FIG. 17. FIG. 17 is a flowchart depicting the hot spare disk selecting process according to the third embodiment.

The hot spare disk selecting process is a process where the storage apparatus 13 selects hot spare disks. The hot spare disk selecting process is executed by the control unit (CPU) of the storage apparatus 13. The control unit may execute the hot spare disk selecting process when a failure of a member disk that constructs a RAID group has been detected and/or as instructed by the host 11.

(Step S81) The control unit acquires information on the member disks. The control unit acquires information on whether each member disk that constructs a RAID group is a failed disk. In the following description, a member disk that has failed is referred to as a "failed member disk" and a member disk that has not failed is referred to as a "normal member disk". The control unit acquires the disk sizes, disk types, and the like of the normal member disks.

(Step S82) The control unit decides a hot spare condition based on the information on the member disks. The hot spare condition is information used as a condition for selecting hot spare disks and includes a variety of information. The control unit sets the largest value out of the disk sizes of the normal member disks as the disk size in the hot spare condition. The control unit sets the disk type of the normal member disks as the disk type of the hot spare condition. Note that when there is a mixture of online SAS and nearline SAS in the disk types of the member disks, one of such types is decided as the disk type of the hot spare condition. As one example, when the disk type of many of the normal member disks is online SAS, it is possible to choose online SAS as the disk type of the hot spare condition.

(Step S83) The control unit generates a hot spare candidate drive enclosure list based on the hot spare condition. The hot spare candidate drive enclosure list is a list of drive enclosures (hot spare candidate drive enclosures) that are candidates for acquiring a hot spare disk. The hot spare candidate drive enclosure list is information which makes it possible to distinguish drive enclosures including disks that are usable as hot spare disks.

(Step S84) The control unit gives weightings to drive enclosures in the hot spare candidate drive enclosure list based on the member disk information. The control unit gives a larger weighting to drive enclosures that include normal member disks than to drive enclosures that do not include member disks.

(Step S85) The control unit generates a first hot spare list by assigning first hot spare keys to the weighted hot spare candidate drive enclosure list. The first hot spare keys are assigned to drive enclosures (drive enclosure groups) that are listed up in the hot spare candidate drive enclosure list. The first hot spare keys are information that makes it possible to sort the drive enclosures in each port group in ascending order of weighting (for example, "0", "1", . . . ).

The control unit gives a larger weighting to drive enclosures that include normal member disks than to other drive enclosures, and by assigning the first keys in ascending order of the weightings, it is possible to lower the priority with which a hot spare disk is selected from a drive enclosure group including normal member disks. The control unit is also capable of lowering the priority with which a hot spare disk is selected from the same port group as a normal member disk. By doing so, the control unit is capable of selecting a hot spare disk so as to increase the data integrity.

(Step S86) The control unit generates a second hot spare list by assigning second hot spare keys to the first hot spare list. The second hot spare keys are assigned to ports (port groups) listed up in the first hot spare list. The second hot spare keys are information (for example, "0", "1", ... ) that makes it possible to sort ports for each controller enclosure group into ascending order of weighting.

(Step S87) The control unit generates a third hot spare list by assigning third hot spare keys to the second hot spare list. The third hot spare keys are assigned to controller enclosures (controller enclosure groups) listed up in the second hot spare list. The third hot spare keys are information (for example, "0", "1", ... ) that makes it possible to sort controller enclosure groups into ascending order of weighting.

(Step S88) The control unit sorts the third hot spare list using the first hot spare keys, the second hot spare keys, and the third hot spare keys to generate a fourth hot spare list.

(Step S89) The control unit assigns hot spare priorities to the drive enclosures in order of the fourth hot spare list.

(Step S90) The control unit selects a hot spare disk from the drive enclosure with the highest hot spare priority. Note that when a plurality of hot spare disks are to be selected, such hot spare disks are selected in accordance with the hot spare priorities.

In this way, by assigning hot spare priorities based on information on the groups to which disks belong, the storage apparatus 13 is capable of distributing the drive enclosures used as candidates for reserving hot spare disks among the groups. This means the storage apparatus 13 is capable of selecting hot spare disks with consideration to redundancy and without biasing the selection toward the same groups.

Next, the hot spare candidate drive enclosure list according to the third embodiment will be described with reference to FIG. 18. FIG. 18 depicts an example of the hot spare candidate drive enclosure list according to the third embodiment.

The hot spare candidate drive enclosure list 400 is information generated by step S83 in the hot spare disk selection process. The hot spare candidate drive enclosure list 400 is a list of drive enclosures included in the storage apparatus 13 that makes it possible to specify the controller enclosures to which drive enclosures are connected, the ports to which drive enclosures are connected, the connection order of drive enclosures to ports, and disk information.

The hot spare candidate drive enclosure list 400 is a list in which codes corresponding to disk information have been assigned to the hot spare candidate drive enclosures. The code "Mn" indicates a drive enclosure that includes a normal member disk. The code "Mb" indicates a drive enclosure that includes a failed member disk. The code "A" indicates a drive enclosure that does not include a member disk but includes a disk that matches the hot spare condition. In the hot spare drive candidate enclosure list 400, hot spare candidate drive enclosures are unshaded and non-hot spare candidate drive enclosures are shaded.

As one example, DE#00 is a hot spare candidate drive enclosure that is connected to CE#00, is connected to Port#00 with the connection order "0", and includes a normal member disk. DE#12 is a hot spare candidate drive enclosure that is connected to CE#01, is connected to Port#04 with the connection order "2", and does not include a member disk but includes a disk that matches the hot spare condition. DE#14 is a non-hot spare candidate drive enclosure that is connected to CE#01, is connected to Port#05 with the connection order "0", and includes a failed member disk.

Next, the weighted hot spare candidate drive enclosure list according to the third embodiment will be described with reference to FIG. 19. FIG. 19 depicts one example of the weighted hot spare candidate drive enclosure list according to the third embodiment.

The weighted hot spare candidate drive enclosure list 401 is information generated by step S84 of the hot spare disk selecting process. The weighted hot spare candidate drive enclosure list 401 indicates hot spare candidate drive enclosures that have been assigned weightings. The weighted hot spare candidate drive enclosure list 401 indicates weightings such as "C=n", "P=n", "Mn=n", and "A=n" in the columns to the right of the hot spare candidate drive enclosures.

As one example, since DE#00 includes a normal member disk, the weighting "Mn=1" is assigned. Since DE#02 is a hot spare candidate drive enclosure that does not include a member disk, the weighting "A=0" is assigned. Port#00 is assigned the total "P=1" of the weightings ("Mn=1" and "A=0") of the connected hot spare candidate drive enclosures. CE#00 is assigned the total "C=3" of the weightings of the connected ports ("P=1", "P=0", and "P=2").

Next, the first hot spare list according to the third embodiment will be described with reference to FIG. 20. FIG. 20 depicts one example of the first hot spare list according to the third embodiment.

The first hot spare list 402 is information generated by step S85 of the hot spare disk selecting process. The first hot spare list 402 indicates hot spare candidate drive enclosures that have been assigned first keys. The first hot spare list 402 depicts the first keys as [n] in the columns to the right of the drive enclosure weightings. The first keys are assigned to the hot spare candidate drive enclosures in units of port groups.

As one example, Port#00 connects DE#00 and DE#02 as hot spare candidate drive enclosures. Since the weighting of DE#00 is "Mn=1" and the weighting of DE#02 is "A=0", in ascending order of weighting, the first key of DE#02 is "0" and the first key of DE#00 is "1". Port#03 connects the two hot spare candidate drive enclosures DE#0C and DE#0E. Since both weightings are the same, in the connection order for Port#03, the first key of DE#0C is [0] and the first key of DE#0E is [1].

Next, the second hot spare list according to the third embodiment will be described with reference to FIG. 21. FIG. 21 depicts one example of the second hot spare list according to the third embodiment.

The second hot spare list 403 is information generated by step S86 of the hot spare disk selecting process. The second hot spare list 403 indicates the first hot spare list that has been assigned second keys. The second hot spare list 403 depicts the second keys as (n) in the column to the right of the port weightings. The second keys are assigned in units of controller enclosure groups to ports to which hot spare candidate drive enclosures are connected.

As one example, CE#00 has three ports ("Port#00", "Port#02", and "Port#03") that are connected to hot spare candidate drive enclosures. The weighting of Port#00 is "P=1", the weighting of Port#02 is "P=0", and the weighting of Port#03 is "P=2". The second keys are assigned in ascending order of port weighting, so that (0) is assigned to Port#02, (1) is assigned to Port#00, and (2) is assigned to Port#03.

Next, the third hot spare list according to the third embodiment will be described with reference to FIG. 22. FIG. 22 depicts one example of the third hot spare list according to the third embodiment. The third hot spare list 404 is information generated by step S87 of the hot spare disk selecting process. The third hot spare list 404 depicts controller enclosures that have been assigned third keys. The third hot spare list 404 depicts the third keys as <n> in the columns to the right of the controller enclosure weightings. The third keys are assigned to the controller enclosures in ascending order of the weightings.

As one example, in the third hot spare list 404, the weighting of CE#00 is "C=3" and the weighting of CE#01 is "C=1". The third keys are assigned in ascending order of the weightings so that <0> is assigned to CE#01 and <1> is assigned to CE#00.

Next, the fourth hot spare list according to the third embodiment will be described with reference to FIG. 23. FIG. 23 depicts one example of the fourth hot spare list according to the third embodiment. The fourth hot spare list 405 is generated by step S89 of the hot spare disk selecting process. The fourth hot spare list 405 is a list of hot spare candidate drive enclosures that have been assigned hot spare priorities in ascending order after sorting the third hot spare list 404 in order of the first keys, the second keys, and the third keys. Note that in the fourth hot spare list 405, when there is no drive enclosure that corresponds to a combination of a first key, a second key, and a third key, the hot spare candidate drive enclosure and the hot spare drive enclosure priority are indicated as "-".

Here, the method by which the storage apparatus selects a hot spare disk using the hot spare priorities will be described. An example where the storage apparatus 13 selects two hot spare disks is described here. The storage apparatus 13 selects a first hot spare disk from DE#16 with the hot spare priority "1" and a second hot spare disk from DE#0A with the hot spare priority "2".

By doing so, the storage apparatus 13 is capable of assigning priorities to groups for selecting disks. This means that the storage apparatus 13 is capable of selecting disks with consideration to redundancy and without the disks being biased toward the same groups.

Based on the condition for selecting hot spare disks, the storage apparatus 13 is capable of reserving hot spare disks that are distributed among groups. This means that the storage apparatus 13 is capable of selecting hot spare disks with consideration to the member disk information and to redundancy without the disks being biased toward the same groups.

Note that the processing functions described above can be realized by a computer. When doing so, a program in which the processing content of the functions of the storage apparatuses 1 and 13 is written is provided. By having such program executed by a computer, the processing functions described above are realized by the computer. A program in which the processing content is written can be recorded on a computer-readable recording medium. A magnetic storage apparatus, an optical disc, a magneto-optical recording medium, and a semiconductor memory can be given as examples of a computer-readable recording medium. The magnetic storage apparatus may be a hard disk drive, a flexible disk, or a magnetic tape. Digital Versatile Disc (DVD), Digital Versatile Disc Random Access Memory (DVD-RAM), Compact Disk Read Only Memory (CD-ROM), and Compact Disk Rewritable (CD-RW) are all examples of optical discs. An Magneto-Optical (MO) disc is one example of a magneto-optical recording medium.

When such program is distributed, as one example portable recording media such as DVDs or CD-ROMs on which the program is recorded may be sold. It is also possible to store the program on a storage apparatus of a server computer and to transfer the program from the server computer via a network to another computer.

For example, the computer that executes the program stores the program recorded on a portable recording medium or the program transferred from a server computer into its own storage apparatus. The computer reads the program from its own storage apparatus and executes processing in accordance with the program. Note that the computer is also capable of directly reading the program from the portable recording medium and executing processing in accordance with the program. It is also possible for a computer to execute processing in accordance with a received program every time a program is transferred from a server computer connected via a network.

At least part of the processing functions described above can be realized by electronic circuits such as a DSP, an ASIC, and a PLD.

According to the present embodiments, when creating a RAID, it is possible to easily select a highly stable combination of storage devices.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage control apparatus comprising:
   a memory configured to store information including:
      selection condition information relating to a selection condition for storage devices to construct a Redundant Array of Inexpensive Disks (RAID),
      group information that associates the storage devices with housing groups and port groups, the housing groups respectively corresponding to different housings that house the storage devices, the port groups respectively corresponding to different ports of a control device that are connected to different subsets of the housings for communication therewith, and
      connection information indicating a connection configuration of the storage devices, the housings, and the control device; and
   a processor configured to perform a procedure including:
      determining candidate storage devices that match the selection condition information, the candidate storage devices being candidates for member devices of a new RAID group to be constructed;
      extracting combinations of the housing groups and port groups, based on the group information stored in the memory, the combinations each including a specific housing group to which one or more of the candidate storage devices belong and a specific port group to which the specific housing group belongs;
      assigning different group priorities to the combinations that are extracted, based on the connection information stored in the memory, the group priorities indicating selection priorities of the combinations;
      selecting one of the combinations in accordance with the group priorities assigned thereto, as well as one storage device out of the candidate storage devices that belong to the one of the combinations, and repeating the selecting until a predetermined number of storage devices have been selected; and constructing a new RAID group from the storage devices that have been selected out of the candidate storage devices.

2. The storage control apparatus according to claim 1, wherein the procedure further includes selecting, when a number of storage devices that have been selected is below the predetermined number, another storage device from each of the combinations that are extracted in accordance with the group priorities until the predetermined number of storage devices have been selected.

3. The storage control apparatus according to claim 1, wherein the procedure further includes selecting, when there is a combination from which it is not possible to select a storage device, a storage device from a combination with a next group priority.

4. The storage control apparatus according to claim 1, wherein the assigning of group priorities includes assigning higher priorities to combinations that include more candidate storage devices that match the selection condition information.

5. A non-transitory computer-readable storage medium storing a storage control program that causes a computer to perform a procedure comprising:

storing, in a memory of the computer, information including:
selection condition information relating to a selection condition for storage devices to construct a Redundant Array of Inexpensive Disks (RAID),
group information that associates the storage devices with housing groups and port groups, the housing groups respectively corresponding to different housings that house the storage devices, the port groups respectively corresponding to different ports of a control device that are connected to different subsets of the housings for communication therewith, and
connection information indicating a connection configuration of the storage devices, the housings, and the control device;

determining candidate storage devices that match selection condition information relating to a selection condition for storage devices, the candidate storage devices being candidates for member devices of a new RAID group to be constructed;

extracting combinations of the housing groups and port groups, based on the group information stored in the memory, the combinations each including a specific housing group to which one or more of the candidate storage devices belong and a specific port group to which the specific housing group belongs;

assigning different group priorities to the combinations that are extracted, based on the connection information stored in the memory, the group priorities indicating selection priorities of the combinations;

selecting one of the combinations in accordance with the group priorities assigned thereto, as well as one storage device out of the candidate storage devices that belong to the one of the combinations, and repeating the selecting until a predetermined number of storage devices have been selected; and constructing a new RAID group from the storage devices that have been selected out of the candidate storage devices.

6. A storage system comprising a storage apparatus and a storage control apparatus that controls the storage apparatus, the storage control apparatus includes:

a memory configured to store information including:
selection condition information relating to a selection condition for storage devices to construct a Redundant Array of Inexpensive Disks (RAID),
group information that associates the storage devices with housing groups and port groups, the housing groups respectively corresponding to different housings that house the storage devices, the port groups respectively corresponding to different ports of a control device that are connected to different subsets of the housings for communication therewith, and
connection information indicating a connection configuration of the storage devices, the housings, and the control device; and a processor configured to perform a procedure including:
determining candidate storage devices that match the selection condition information, the candidate storage devices being candidates for member devices of a new RAID group to be constructed;
extracting combinations of the housing groups and port groups, based on the group information stored in the memory, the combinations each including a specific housing group to which one or more of the candidate storage devices belong and a specific port group to which the specific housing group belongs;
assigning different group priorities to the combinations that are extracted, based on the connection information stored in the memory, the group priorities indicating selection priorities of the combinations;
selecting one of the combinations in accordance with the group priorities assigned thereto, as well as one storage device out of the candidate storage devices that belong to the one of the combinations, and repeating the selecting until a predetermined number of storage devices have been selected; and
constructing a new RAID group from the storage devices that have been selected out of the candidate storage devices.

7. The storage control apparatus according to claim 1, wherein:

the group information further associates the storage devices with control device groups respectively corresponding to different control devices each having one or more ports, so that the storage devices are divided into groups in terms of control devices associated therewith; and the extracting of combinations includes extracting, based on the group information, combinations of the housing groups, port groups, and control device groups, the combinations each including a specific housing group to which one or more of the candidate storage devices belong, a specific port group to which the specific housing group belongs, and a specific control device group to which the specific port group belongs.

* * * * *